United States Patent
Leonard

(10) Patent No.: US 9,370,984 B2
(45) Date of Patent: Jun. 21, 2016

(54) GAS SPRING AND GAS DAMPER ASSEMBLIES AND METHODS OF ASSEMBLY

(71) Applicant: Firestone Industrial Products Company, LLC, Indianapolis, IN (US)

(72) Inventor: Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/423,972

(22) PCT Filed: Aug. 31, 2013

(86) PCT No.: PCT/US2013/057754
§ 371 (c)(1),
(2) Date: Feb. 25, 2015

(87) PCT Pub. No.: WO2014/036541
PCT Pub. Date: Mar. 6, 2014

(65) Prior Publication Data
US 2015/0217617 A1    Aug. 6, 2015

Related U.S. Application Data

(60) Provisional application No. 61/695,844, filed on Aug. 31, 2012.

(51) Int. Cl.
*B60G 15/12* (2006.01)
*B60G 11/62* (2006.01)
(Continued)

(52) U.S. Cl.
CPC .............. *B60G 15/12* (2013.01); *B60G 11/62* (2013.01); *B60G 15/08* (2013.01); *F16F 9/0472* (2013.01);
(Continued)

(58) Field of Classification Search
CPC ........ B60G 15/12; B60G 11/62; B60G 15/08; B60G 2206/80; B60G 2204/1262; B60G 2206/91; B60G 2202/143; B60G 2206/40; B60G 2204/416; B60G 2202/314; F16F 13/20; F16F 13/06; F16F 9/585; F16F 9/052; F16F 9/0472; Y10T 29/49611
See application file for complete search history.

(56) References Cited

U.S. PATENT DOCUMENTS 2,649,213 A * 8/1953 Withall .................... B61G 9/10
                                                    105/198.7
2,749,114 A * 6/1956 Withall .................... F16F 1/403
                                                    213/40 S (Continued)

FOREIGN PATENT DOCUMENTS

WO    WO 79/00948      11/1979
WO    WO 2012/054520    4/2012
WO    WO 2012/054537    4/2012

OTHER PUBLICATIONS

International Search Report and Written Opinion for corresponding patent application No. PCT/US2013/057754 dated Nov. 27, 2013.

*Primary Examiner* — Drew Brown
(74) *Attorney, Agent, or Firm* — Thomas R. Kingsbury; Fay Sharpe LLP

(57) ABSTRACT

A gas spring and gas damper assembly (200) can include a gas spring and a gas damper. The gas spring can include a first end member, a second end member and a flexible wall that at least partially forms a spring chamber. The gas damper can include first and second damper elements (278, 280) as well as a damper element assembly that are telescopically interconnected with one another. The damper element assembly can include an outer side wall portion that at least partially defines a cavity and a biasing element extending into the cavity. A suspension system and a method of assembly are also included.

20 Claims, 11 Drawing Sheets

(51) Int. Cl.
  *B60G 15/08* (2006.01)
  *F16F 9/58* (2006.01)
  *F16F 9/04* (2006.01)
  *F16F 9/05* (2006.01)
  *F16F 13/06* (2006.01)
  *F16F 13/20* (2006.01)

(52) U.S. Cl.
  CPC ............... *F16F 9/052* (2013.01); *F16F 9/585* (2013.01); *F16F 13/06* (2013.01); *F16F 13/20* (2013.01); *B60G 2202/143* (2013.01); *B60G 2202/314* (2013.01); *B60G 2204/1262* (2013.01); *B60G 2204/416* (2013.01); *B60G 2206/40* (2013.01); *B60G 2206/80* (2013.01); *B60G 2206/91* (2013.01); *Y10T 29/49611* (2015.01)

(56) References Cited

U.S. PATENT DOCUMENTS

| | | | |
|---|---|---|---|
| 4,211,429 A * | 7/1980 | Howard | B60G 11/62 267/219 |
| 4,791,712 A | 12/1988 | Wells | |
| 4,934,667 A | 6/1990 | Pees | |
| 5,996,978 A * | 12/1999 | Asanuma | B60G 17/0408 188/315 |
| 6,406,010 B1 * | 6/2002 | Yano | F16F 13/264 267/140.13 |
| 2004/0012136 A1 * | 1/2004 | Mennesson | B60G 11/52 267/220 |
| 2006/0219503 A1 * | 10/2006 | Kim | B60G 15/12 188/282.2 |
| 2007/0017761 A1 * | 1/2007 | Huprikar | B60G 7/04 188/321.11 |
| 2009/0194920 A1 * | 8/2009 | Love | B60G 13/04 267/121 |
| 2011/0140324 A1 * | 6/2011 | Naber | B60G 15/12 267/140.13 |
| 2013/0234377 A1 * | 9/2013 | Leonard | B60G 15/00 267/219 |
| 2015/0239315 A1 * | 8/2015 | Al-Dahhan | F16F 1/377 280/124.177 |
| 2015/0273968 A1 * | 10/2015 | DeBruler | B60G 15/14 267/64.24 |

* cited by examiner

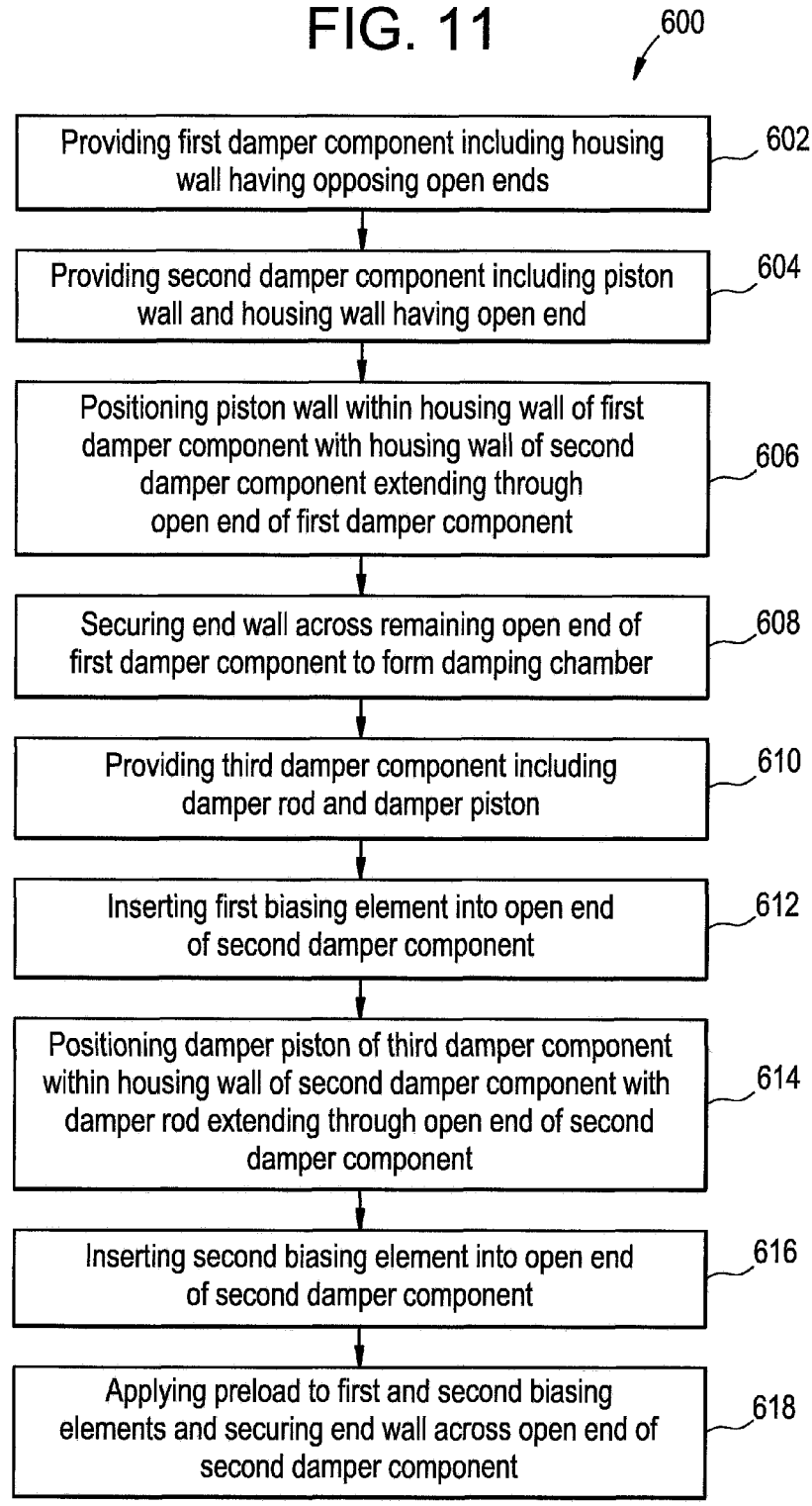

US 9,370,984 B2

GAS SPRING AND GAS DAMPER ASSEMBLIES AND METHODS OF ASSEMBLY

This application is the National Stage of International Application No. PCT/US2013/057754, filed on Aug. 31, 2013, which claims the benefit of priority from U.S. Provisional Patent Application No. 61/695,844, filed on Aug. 31, 2012, the subject matter of which is hereby incorporated herein by reference in its entirety.

BACKGROUND

The present disclosure broadly relates to the art of spring devices and, more particularly, to gas spring and gas damper assemblies as well as vehicle suspension systems that include one or more of such gas spring and gas damper assemblies and methods of assembling such gas spring and gas damper assemblies.

Suspension systems, such as may be used in connection with apparatuses, such as motorized vehicles, for example, can include one or more spring elements for accommodating forces and loads associated with the operation and use of the corresponding apparatus (e.g., a motorized vehicle) to which the suspension system is operatively connected. In such applications, it is often considered desirable to utilize spring elements that operate at a lower relative spring rate, as such a reduced spring rate can favorably influence certain performance characteristics, such as vehicle ride quality and comfort, for example. That is, it is well understood in the art that the use of a spring element having a higher spring rate (i.e. a stiffer spring) will transmit a greater magnitude of inputs (e.g., road inputs) to the sprung mass and that, in some applications, this could undesirably affect the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass.

Such suspension systems also commonly include one or more dampers or damping components that are operative to dissipate energy associated with undesired inputs and movements of the sprung mass, such as road inputs occurring under dynamic operation of a vehicle, for example. Typically, such dampers are liquid filled and operatively connected between a sprung mass and an unsprung mass, such as between a body and axle of a vehicle, for example. One example of such damping components are conventional shock absorbers that are commonly used in vehicle suspension systems.

In other arrangements, however, the dampers or damping components can be of a type and kind that utilizes gas rather than liquid as the working medium. In such known constructions, the gas damper portion permits gas flow between two or more volumes of pressurized gas, such as through one or more orifices, as shown, for example, in U.S. Patent Application Publication No. 2004/0124571, or through one or more valve ports, as shown, for example, in U.S. Pat. No. 7,213,799. Generally, there is some resistance to the movement of pressurized gas through these passages or ports, and this resistance acts to dissipate energy associated with the gas spring portion and thereby provide some measure of damping.

One factor that may be limiting the broader adoption and use of gas spring and gas damper assemblies relates to the significant travel of which gas spring devices are capable. That is, gas spring devices are capable of being displaced between a minimum or compressed height and a maximum or extended height and the difference in these overall heights can be substantial.

Certain difficulties relating to the incorporation of gas dampers into gas spring devices have been associated with the aforementioned differences in overall height of gas spring devices. At one extreme, the minimum or compressed height of a gas spring device will act to limit the overall length of components that can be housed within the gas spring device. At the other extreme, any components housed within the gas spring device should remain operatively connected between the opposing end members of the gas spring device in the extended condition thereof.

Accordingly, it is desired to develop a gas spring and gas damper assembly as well as a suspension system and method of assembly that overcome the foregoing and/or other difficulties associated with known constructions, and/or which may otherwise advance the art of gas spring and gas damper assemblies.

BRIEF SUMMARY

One example of a damper element assembly in accordance with the subject matter of the present disclosure that is dimensioned for use in an associated gas spring and gas damper assembly can include a damper rod having a longitudinal axis and extending longitudinally between opposing first and second ends. A first piston element can be supported along the second end of the damper rod. The first piston element can include an end wall portion and an outer side wall portion extending from along the end wall portion in a first axial direction toward the first end. A second piston element can be disposed along the second end of the damper rod. The second piston element can include an end wall and an outer side wall extending from along the end wall. The second piston element can be oriented such that the end wall thereof is disposed toward the end wall of the first piston element and the outer side wall of the second piston element extends in a second axial direction opposite the first axial direction.

Another example of a damper element assembly in accordance with the subject matter of the present disclosure that is dimensioned for use in an associated gas spring and gas damper assembly can include a damper rod having a longitudinal axis and extending longitudinally between opposing first and second ends. A first outer side wall portion can be disposed along the second end of the damper rod. The first outer side wall portion can extend peripherally about the longitudinal axis and can extend in a generally longitudinally direction. The first outer side wall portion can be disposed in radially-outward spaced relation to the damper rod and can include an inner surface and an outer surface. The inner surface can at least partially define a first cavity having a first open end. A first biasing element can be operatively associated with the damper rod. The first biasing element can include a base end, a distal end and an outer surface. At least a portion of the base end of the first biasing element can be disposed within the first cavity and at least a portion of the outer surface of the first biasing element can be disposed adjacent the inner surface of the first outer side wall portion such that under load conditions in which the first biasing element is compressed the first outer side wall portion can restrain radially-outward expansion of the first biasing element.

One example of a gas spring and gas damper assembly in accordance with the subject matter of the present disclosure can include a gas spring assembly and a gas damper assembly. The gas spring assembly can having a longitudinal axis, and can include a first end member and a second end member that is disposed in longitudinally-spaced relation to the first end member. A flexible wall can be secured between the first and second end members and can extend circumferentially about the longitudinal axis to at least partially define a spring chamber between the first and second end members. The gas damper assembly can be disposed within the spring chamber of the gas spring assembly and can be operatively connected between the first and second end members. The gas damper assembly can include a first damper element that is operatively connected to the first end member. The first damper element can include a first wall that at least partially defines a first damping chamber. A second damper element can include a first end received within the first damping chamber and an opposing second end that projects outwardly from the first damping chamber. The second damper element can include a second wall that at least partially defines a second damping chamber with the second damping chamber being accessible from outside the first damping chamber. The second damper element can be reciprocally displaceable in an approximately longitudinal direction with respect to the first damper element. A damper element assembly according to either one of the foregoing two paragraphs. The damper element assembly can be operatively connected to the second end member. The damper element assembly can be oriented such that at least either a) the first piston element or b) the first outer side wall portion is disposed within the second damping chamber.

One example of a suspension system in accordance with the subject matter of the present disclosure can include at least one gas spring and gas damper assembly according to the foregoing paragraph, and a pressurized gas system operative to selectively transfer pressurized gas into and out of the at least one gas spring and gas damper assembly.

One example of a method of assembling a gas spring and gas damper assembly in accordance with the subject matter of the present disclosure can include providing a first damper element that includes a first end wall and a first side wall that at least partially defines a first damping chamber. The method can also include providing a second damper element extending longitudinally between a first end and a second end opposite the first end. The second damper element can include an end wall and a second side wall that at least partially defines a second damping chamber. The end wall can be disposed transverse to the second side wall and can at least partially forming a second element piston. The method can further include positioning the second element piston and at least a portion of the second side wall within the first damping chamber such that the second damper element can be slidably supported within the first damping chamber and the second element piston can be displaceable relative to the first side wall of the first damper element. The method can also include providing a damper element assembly according to any one of the foregoing paragraphs, and orienting the damper element assembly such that at least either a) the first piston element or b) the first outer side wall portion is disposed within the second damping chamber.

BRIEF DESCRIPTION OF THE DRAWINGS

FIG. 11 is a graphical representation of one example of a method of assembling a gas damper assembly in accordance with the subject matter of the present disclosure.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
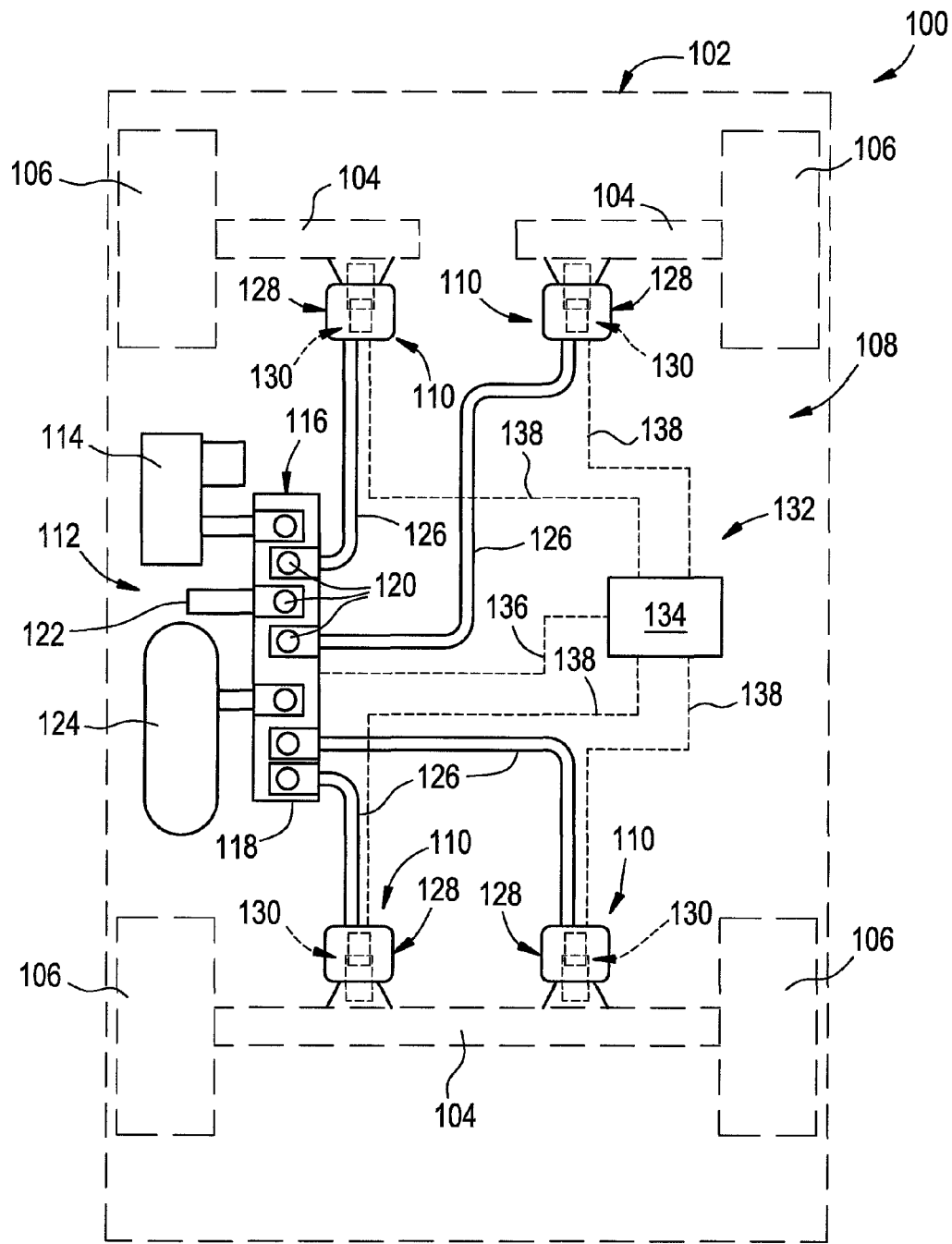
FIG. 1 is a schematic representation of one example of a vehicle including a suspension system utilizing gas spring and gas damper assemblies in accordance with the subject matter of the present disclosure.
Figure 2:
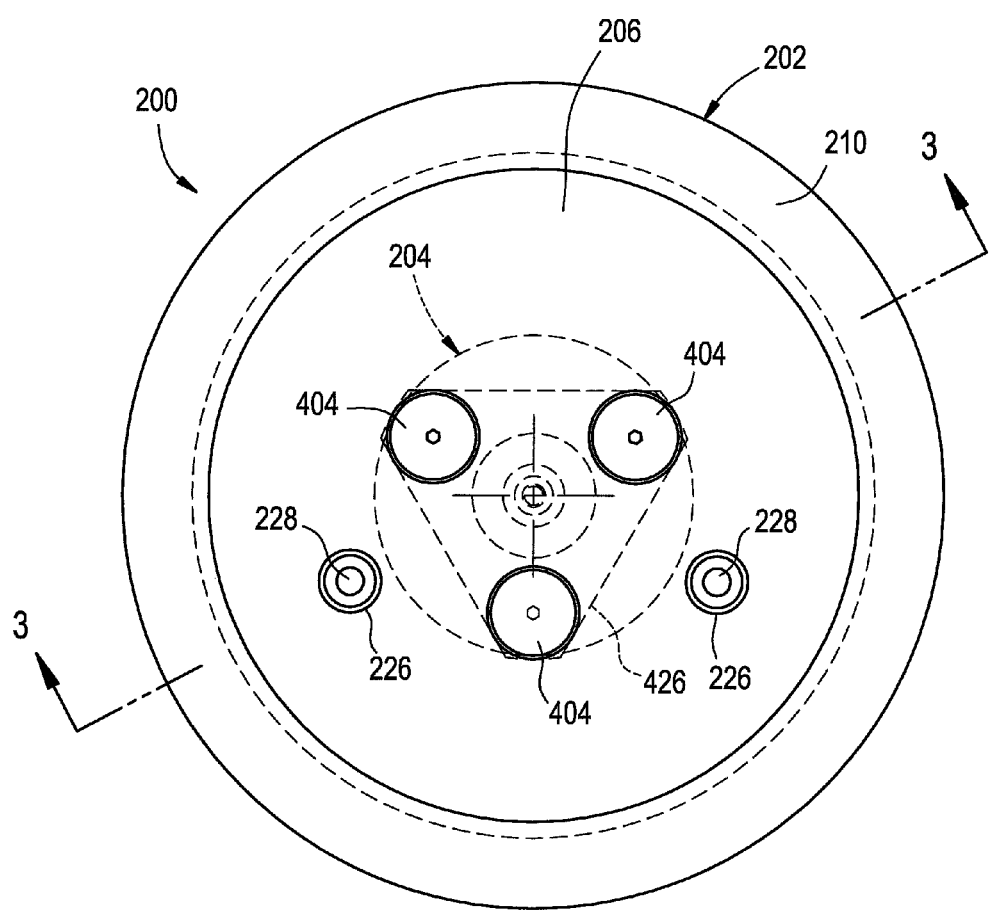
FIG. 2 is a top plan view of one example of a gas spring and gas damper assembly in accordance with the subject matter of the present disclosure.

FIG. 1 illustrates a vehicle 100 having a sprung mass, such as a vehicle body 102, for example, and an unsprung mass, such as axles 104 and/or wheels 106, for example. Additionally, vehicle 100 can include a suspension system 108 that is operatively connected between the sprung and unsprung masses. The suspension system can include a plurality of gas spring and gas damper assemblies 110 that are operatively connected between the sprung and unsprung masses of the vehicle. Assemblies 110 can be disposed between the sprung and unsprung masses in any suitable manner, configuration and/or arrangement. For example, assemblies 110 are shown in FIG. 1 as being disposed adjacent wheels 106. Depending on desired performance characteristics and/or other factors, the suspension system may, in some cases, also include damping members (not shown) of a typical construction that are provided separately from assemblies 110 and secured between the sprung and unsprung masses in a conventional manner. In a preferred arrangement, however, gas spring and gas damper assemblies 110 will be sized, configured and operative to provide the desired performance characteristics for the suspension system without the use of additional damping members (e.g., conventional struts or shock absorbers) that are separately provided.

Suspension system 108 can also include a pressurized gas system 112 that is operatively associated with gas spring and gas damper assemblies 110 for selectively supplying pressurized gas (e.g., air) thereto and selectively transferring pressurized gas therefrom. In the exemplary embodiment shown in FIG. 1, pressurized gas system 112 includes a pressurized gas source, such as a compressor 114, for example, for generating pressurized air or other gases. A control device, such as a valve assembly 116, for example, is shown as being in communication with compressor 114 and can be of any suitable configuration or arrangement. In the exemplary embodiment shown, valve assembly 116 includes a valve block 118 with a plurality of valves 120 supported thereon. Valve assembly 116 can also optionally include a suitable exhaust, such as a muffler 122, for example, for venting pressurized gas from the system. Optionally, pressurized gas system 112 can also include a reservoir 124 in fluid communication with compressor 114 and/or valve assembly 116 and suitable for storing pressurized gas.

Valve assembly 116 is in communication with gas spring and gas damper assemblies 110 through suitable gas transfer lines 126. As such, pressurized gas can be selectively distributed or otherwise transferred into and/or out of the gas spring and gas damper assemblies through valve assembly 116 by selectively operating valves 120, such as to alter or maintain vehicle height at one or more corners of the vehicle, for example.

It will be appreciated that gas spring and gas damper assemblies 110 can take any suitable form, configuration and/or construction in accordance with the subject matter of the present disclosure. In the arrangement shown in FIG. 1, gas spring and gas damper assemblies 110 include a gas spring assembly 128 and a gas damper assembly, which is schematically represented in FIG. 1 by item number 130, that is substantially-entirely contained within the gas spring assembly. Gas spring assemblies 128 include a spring chamber (not numbered) that is operative to receive and retain a quantity of pressurized gas. Gas damper assemblies 130 can include a plurality of components that are telescopically interconnected with one another and at least partially define a plurality of damping chambers. In some cases, one of the gas dampers can be at least partially received within the spring chamber of a gas spring assembly with one or more of the damping chambers being in fluid communication with the spring chamber of the gas spring assembly.

In operation of the exemplary arrangement shown in FIG. 1, valve assembly 116 can be selectively actuated to transfer pressurized gas from the compressor and/or reservoir to one or more of gas spring and gas damper assemblies 110 via one or more of gas transfer lines 126. Additionally, valve assembly 116 can be selectively actuated to exhaust pressurized gas from one or more of the gas spring and gas damper assemblies through the gas transfer lines, such as by way of muffler 122 or another suitable arrangement. It will be appreciated that the foregoing pressurized gas system and operation thereof are merely exemplary and that other suitable pressurized gas sources, systems and/or methods of operation could alternately be used without departing from the subject matter of the present disclosure.

Suspension system 108 also includes a control system 132 for selectively operating, adjusting or otherwise influencing or controlling the performance or one or more suspension system components, such as gas spring and gas damper assemblies 110 and/or pressurized gas system 112, for example. Control system 132 can include an electronic control unit (ECU) 134 in communication with one or more components of pressurized gas system 112, such as compressor 114 and/or valve assembly 116, for example, such as by way of a communication line 136, for example, for selective actuation and/or operation thereof. Electronic control unit 134 is also shown in FIG. 1 as being in communication with suitable height sensing devices (not shown in FIG. 1) that can, optionally, be used in association with gas spring and gas damper assemblies 110. It will be appreciated that such communications can be implemented in any suitable manner, such as by way of communication lines 138, for example. Additionally, it will be appreciated that height sensors or other distance-determining devices of any suitable type, kind, construction and/or configuration can be used, such as mechanical linkage sensors, ultrasonic wave sensors or electromagnetic wave sensors, for example. Additionally, other sensors, sensing devices and/or other such components can also, optionally, be used in connection with suspension control system 132, such as pressure sensors, accelerometers and/or temperature sensors, for example.

Figure 3:
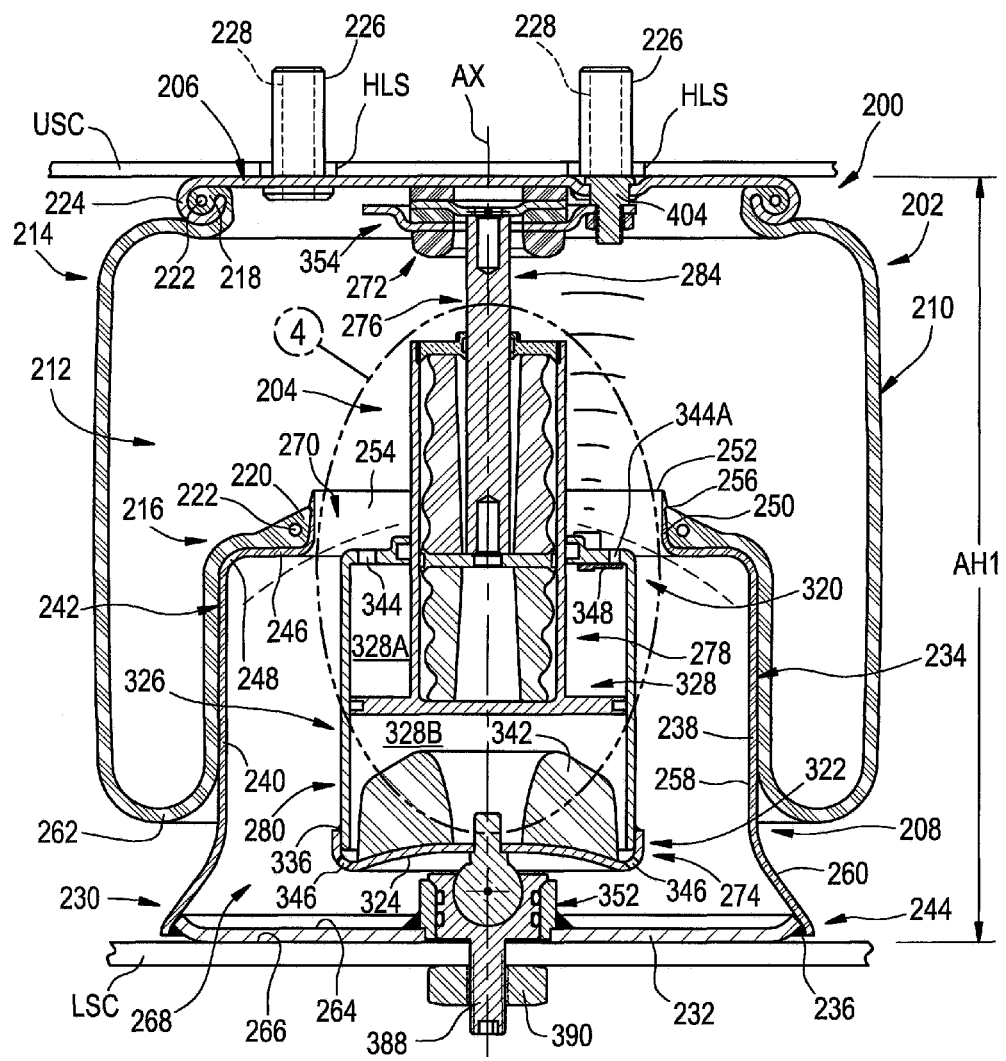
FIG. 3 is a cross-sectional side view of the gas spring and gas damper assembly shown in FIG. 2 taken from along line 3-3 thereof.

One example of a gas spring and gas damper assembly 200 in accordance with the subject matter of the present disclosure, such as may be suitable for use as assemblies 110 in FIG. 1, for example, is shown in FIGS. 2-7. Gas spring and gas damper assembly 200 includes a gas spring assembly 202 and a gas damper assembly 204 that is substantially-entirely housed within the gas spring assembly. Gas spring assembly 202 can be of any type, kind, construction, configuration and/or arrangement. As one example, assembly 200 is shown in FIGS. 2-7 as being of a rolling lobe-type construction, and can include a first end member, an opposing second end member spaced longitudinally from the first end member and a flexible wall that is operatively connected therebetween. It will be appreciated, however, that other gas spring assembly constructions could alternately be used, such as a convoluted bellow-type construction, for example. Additionally, gas spring assembly 202 can be operatively connected between opposing structural components in any suitable manner, such as, for example, are generally represented in FIG. 3 by upper structural component USC (e.g., vehicle body 102 in FIG. 1) and lower structural component LSC (e.g., axle 104 in FIG. 1).

In the exemplary arrangement shown in FIGS. 2-8, gas spring assembly 202 has a longitudinally-extending axis AX and includes a first or upper end member, such as a bead plate 206, for example, and an opposing second or lower end member, such as a piston (or roll-off piston) 208, for example, that is spaced longitudinally from the first end member. A flexible wall, such as a flexible sleeve 210, for example, can be secured between the first end member (e.g., bead plate 206) and the second end member (e.g., piston 208) in a suitable manner such that a spring chamber 212 is at least partially formed therebetween.

Flexible sleeve 210 extends in a generally longitudinal manner between a sleeve end 214 and a sleeve end 216. Flexible sleeve 210 includes a mounting bead 218 along sleeve end 214 and a mounting bead 220 along sleeve end 216. Mounting beads 218 and 220 can optionally include a reinforcing element or other suitable component, such as a bead wire 222, for example.

End 214 of flexible sleeve 210 can be secured on or along the end member in any suitable manner. For example, mounting bead 218 of the flexible sleeve can be captured by an outer peripheral edge 224 of bead plate 206. The outer peripheral edge can be deformed around mounting bead 218 in any manner suitable for forming a substantially fluid-tight seal therewith. One or more securement devices, such as mounting studs 226, for example, can be included along bead plate 206 and project through the associated structural component (e.g., upper structural component USC) in a manner suitable for receiving a corresponding securement device or element (not shown) to secure the first end member to the associated structural component. In the exemplary embodiment shown in FIG. 3, mounting studs 226 project axially outwardly from the bead plate and extend through holes HLS in upper structural component USC.

Additionally, a fluid communication port, such as a gas transfer passage 228, for example, can optionally be provided on or along the first or upper end member to permit fluid communication with spring chamber 212. In the exemplary embodiment shown, gas transfer passages 228 extend through mounting studs 226 and are in fluid communication with the spring chamber. It will be appreciated, however, that any other suitable fluid communication arrangement could alternately be used.

Mounting bead 220 of flexible sleeve 210 can be secured to the second end member in any suitable manner. As one example, the mounting bead could be retained on or along the piston using one or more retaining elements or components (e.g., crimp rings or retaining caps). As another example, mounting bead 220 could be friction fit along a wall portion of piston 208 and, optionally, at least partially retained thereon using a radially outwardly-extending projection. It will be appreciated, however, that any other suitable arrangement and/or configuration could alternately be used.

In the exemplary embodiment in FIGS. 3 and 5-7, for example, piston 208 is shown as including piston body 230 that is formed from a base member 232 and an outer shell 234, which is operatively connected to the base member such that a substantially fluid-tight seal is formed therebetween, such as through the use of a flowed-material joint 236 extending circumferentially about axis AX, for example. It will be appreciated, however, that in other cases, a piston body could be used in which the base member and outer shell are integrally formed with one another, such as through the use of an injection molding process, for example. In such case, the base member could be alternately referred to as a base portion or base member portion, and the outer shell could be alternately referred to as an outer shell portion.

Outer shell (or outer shell portion) 234 includes a shell wall 238 that extends circumferentially about axis AX. Shell wall 238 includes an outer side wall portion 240 that extends in a generally longitudinal direction between an end 242, which is disposed toward bead plate 206, and an end 244, which is disposed in longitudinally spaced relation to end 242 and toward lower structural component LSC. Shell wall 238 also includes an end wall portion 246 that transitions into outer side wall portion 240 at a curved or shoulder portion 248. An inner side wall portion 250 projects from end wall portion 246 in a direction extending axially away from end 244. Inner side wall portion 250 terminates in the axial direction at an end 252. Additionally, inner side wall portion 250 includes an outer surface (not numbered) facing radially outward and an inner surface 254 facing radially inward. A projection 256 extends radially-outwardly from along the outer surface adjacent end 252 of inner side wall portion 250.

It will be recognized that a wide variety of shapes, profiles and/or configurations can and have been used in forming the outer side wall of a gas spring piston. As such, it will be appreciated that outer side wall portion 240 of shell wall 238 can be of any suitable shape, profile and/or configuration and that the profile shown in FIGS. 2-7 is merely exemplary. Mounting bead 220 of flexible sleeve 210 can be received on or along the outer surface of inner side wall portion 250 such that a substantially fluid-tight seal is formed therebetween with projection 256 at least partially retaining mounting bead 220 on inner side wall portion 250. Additionally, outer side wall portion 240 of shell wall 238 includes an inside surface 258 and an outside surface 260. As such, a portion of flexible sleeve 210 extends along end wall portion 246 and outside surface 260 of outer side wall portion 240 such that a rolling lobe 262 is formed along piston body 230 and is displaced along the outer side wall portion as the gas spring assembly undergoes changes in overall height.

Base member 232 includes an inside surface 264 and an outside surface 266, which can be disposed in abutting engagement with lower structural component LSC. Inside surface 264 of base member 232 and inside surface 258 of outer side wall portion 240 at least partially define a piston chamber 268 within piston 208. Inner surface 254 of inner side wall portion 250 at least partially defines an opening or passage 270 into piston 208 by which piston chamber 268 is in fluid communication with spring chamber 212. In a preferred arrangement, inner surface 254 defines an opening or passage (e.g., passage 270) into piston chamber 268 that is of sufficient size to permit piston chamber 268 and spring chamber 212 to operate as a substantially unified fluid chamber. That is, in a preferred arrangement, passage 270 will be sufficiently large that minimal fluid flow restriction (e.g., approximate zero fluid flow restriction) will occur for pressurized gas flowing between spring chamber 212 and piston chamber 268 under typical conditions of operation.

Gas damper assembly 204 is shown in FIGS. 3-7 as being substantially entirely contained within gas spring assembly 202 and extending longitudinally between an end 272 that is operatively connected to bead plate 206 and an end 274 that is operatively connected to piston 208. Gas damper assembly 204 includes a plurality of damper elements that are operatively interconnected with one another for telescopic extension and compression in relation to corresponding extension and compression of gas spring assembly 202.

In the exemplary arrangement in FIGS. 3-7, gas damper assembly 204 is shown as including damper elements 276, 278 and 280 that are operatively interconnected with one another for telescopic extension and compression. Damper element 276 is operatively connected to the first end member (e.g., bead plate 206) and extends from the first end member toward the second end member (e.g., piston 208). Damper element 280 is operatively connected to the second end member (e.g. piston 208) and extends from the second end member toward the first end member (e.g., bead plate 206). Damper element 278 is disposed longitudinally between damper elements 276 and 280, and is operatively interconnected therewith such that damper elements 276 and 278 can move relative to one another and such that damper element 278 and 280 can move relative to one another.

Figure 4:
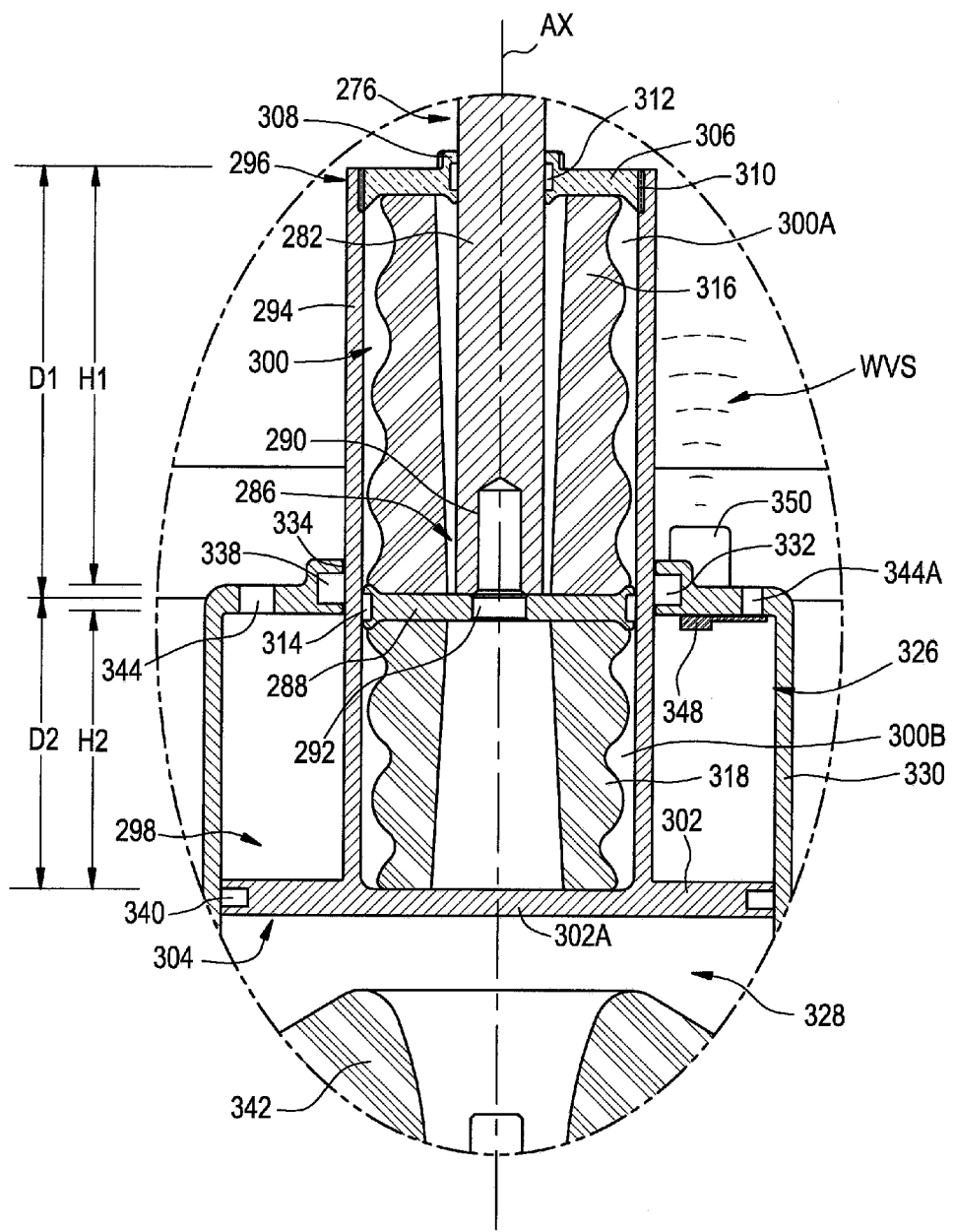
FIG. 4 is an enlarged, cross-sectional view of the portion of the gas spring and gas damper assembly in FIGS. 2 and 3 identified as Detail 4 in FIG. 3.

As shown in FIG. 4, damper element 276 includes a damper rod 282 that extends longitudinally from an end 284 (FIG. 3) to an end 286. A damper piston 288 is disposed along end 286 of damper rod 282 and can be attached or otherwise connected thereto in any suitable manner. For example, damper piston 288 could be integrally formed with damper rod 282. As another example, end 286 of damper rod 282 could include a securement feature, such as a threaded passage 290, for example. Damper piston 288 could include a hole 292 extending therethrough such that a securement device, such as a threaded fastener (not shown), for example, could be used to secure damper piston 288 along end 286 of damper rod 282.

Damper element 278 includes a side wall 294 extending circumferentially about axis AX between longitudinally-spaced ends 296 and 298 such that a longitudinally-extending damping chamber 300 is at least partially formed by side wall 294. A piston wall 302 extends radially outwardly beyond side wall 294 such that a damper piston 304 is formed along end 298 of damper element 278. An end wall 306 is secured across end 296 of side wall 294 and thereby further encloses and defines damping chamber 300. End wall 306 includes a passage wall 308 that at least partially defines a rod passage (not numbered) extending through the end wall. Additionally, an outer peripheral edge (not numbered) of end wall 306 can include a securement feature and end 296 of side wall 294 can include a securement feature that is complimentary to the securement feature of end wall 306, such that the end wall can be secured across the end of the side wall. In a preferred arrangement, one or more helical threads are disposed along the outer peripheral edge of end wall 306 and one or more corresponding helical threads are disposed along end 296 of side wall 294 such that a threaded connection 310 can be formed therebetween. While it will be appreciated that other securement features could alternately be used, one benefit of using a threaded connection, such as has been described above, is that the same facilitates assembly, as will be described in additional detail hereinafter.

As discussed above, damper elements 276 and 278 are operatively interengaged with one another for telescopic extension and compression. In the exemplary arrangement shown, damper piston 288 is disposed within damping chamber 300 and damper rod 282 extends out of damping chamber 300 through the rod passage (not numbered) that is at least partially defined by passage wall 308. As such, end 284 of damper rod 282 is disposed outwardly of damping chamber 300 and can be operatively connected along bead plate 206 in a suitable manner, such as will be described in additional detail hereinafter.

Damping chamber 300 is separated by damper piston 288 into chamber portions 300A and 300B. In some cases, it may be desirable to maintain chamber portions 300A and 300B in fluidic isolation from one another, such as by including one or more sealing elements (not shown) operatively disposed between damper piston 288 and side wall 294. Additionally, it may be desirable to include one or more sealing elements (not shown) between damper rod 282 and passage wall 308, such that a substantially fluid-tight seal is formed therebetween and such that damping chamber 300 and spring chamber 212 are fluidically isolated from one another through the rod passage. In such case, additional fluid communication ports (not shown) can be selectively provided in one or more of damper piston 288, end wall 306 and/or a central portion 302A of piston wall 302. Such additional fluid communication ports can be sized and configured to generate damping forces during relative movement between damper element 276 and damper element 278.

It will be recognized that significant frictional forces may be generated by the sealing arrangements described above in connection with the interface between damper piston 288 and side wall 294 as well as in connection with the interface between damper rod 282 and passage wall 308. In some cases, it may be desirable to avoid these frictional forces (or for other reasons) by forgoing the use of sealing elements along the interface between damper piston 288 and side wall 294 and/or along the interface between damper rod 282 and passage wall 308. In such case, a friction reducing bushing or wear band can, optionally, be disposed between the damper piston and the side wall and/or between the damper rod and the passage wall. As identified in FIG. 4, friction-reducing bushings or wear bands 312 and 314 are respectively disposed between damper piston 288 and side wall 294 and between damper rod 282 and passage wall 308.

Gas damper assembly 204 can also include at least one biasing element disposed within damping chamber 300 and can be operative to act between damper piston 288 and end wall 306 and/or central portion 302A of piston wall 302. In the exemplary arrangement shown in FIGS. 3-7, two biasing elements are included. Biasing element 316 is disposed within chamber portion 300A and is operative to act on and between damper piston 288 and end wall 306. Biasing element 318 is disposed within chamber portion 300B and is operative to act on and between damper piston 288 and central portion 302A of piston wall 302. One benefit of including a biasing element, such as biasing element 316 and/or 318, for example, within one or both of the chamber portions (e.g., chamber portions 300A and 300B) is that the biasing element can act as a bumper or cushion that impedes direct physical contact between damper piston 288 and a corresponding one of end wall 306 and/or central portion 302A of piston wall 302.

Another benefit of including a biasing element, such as biasing element 316 and/or 318, for example, within one or both of the chamber portions (e.g., chamber portions 300A and 300B) is that the biasing element(s) can act to establish and/or control the longitudinal position of damper element 278 relative to other components of the gas damper assembly, as will be discussed in greater detail hereinafter. Additionally, during operation, the longitudinal forces acting between damper element 276 and damper element 278 will deflect biasing elements 316 and 318 to varying degrees and in various manners, as will be described in greater detail hereinafter. It will be appreciated that a biasing force threshold will correspond with or otherwise have a relation to the spring rate of the one or more biasing elements (e.g., biasing elements 316 and/or 318). As such, it will be recognized that where two biasing elements are used, such as biasing elements 316 and 318, for example, the biasing elements could have different spring rates, such as, for example, by using different materials or combinations of materials for the biasing elements and/or by using different sizes, dimensions and/or proportions for the biasing elements.

As an example, biasing element 316 is disposed within chamber portion 300A and abuttingly engages damper piston 288 and end wall 306. Biasing element 316 is shown as including a first height, which is represented in FIG. 4 by reference dimension H1, and has a first spring rate, such as, for example, may be established or otherwise at least partially defined by the material (or combination of materials) from which the biasing element is formed and/or by the size, shape and/or proportions of the biasing element. Additionally, biasing element 318 is disposed within chamber portion 300B and abuttingly engages damper piston 288 and central portion 302A of piston wall 302. Biasing element 318 is shown as including a second height, which is represented in FIG. 4 by reference dimension H2, and has a second spring rate, such as, for example, may be established or otherwise at least partially defined by the material (or combination of materials) from which the biasing element is formed and/or by the size, shape and/or proportions of the biasing element. In some cases, the first and second spring rates may be approximately equal to one another. In other cases, however, the first and second spring rates may be different from one another such that the first spring rate is either greater or less than the second spring rate, as may be desirable for a particular application and/or use. Examples of suitable materials for use as or in forming biasing elements, such as elements 316 and/or 318, for example, can include elastomeric polymers, such as foamed and unfoamed polyurethane, foamed and unfoamed natural rubber, and foamed and unfoamed synthetic rubber, such as in the form of open-cell or closed-cell spring elements. Other examples can include biasing elements formed from metals, such as steel coil springs, for example.

As indicated above, biasing element 316 is shown as having a height H1 and biasing element 318 is shown as having a height H2 that is different from height H1. As such, it will be recognized that end wall 306 is disposed a first distance from damper piston 288, which first distance is represented in FIG. 4 by reference dimension D1, and central portion 302A of piston wall 302 is disposed a second distance from damper piston 288, which second distance is represented in FIG. 4 by reference dimension D2, with the first distance being greater than the second distance. Accordingly, central portion 302A of piston wall 302 is shown as being longitudinally positioned nearer to damper piston 288 and end wall 306 is shown as being longitudinally positioned further from damper piston 288. It will be appreciated, however, that the damper piston could alternately be longitudinally positioned approximately centrally between the end wall and the central portion of the piston wall, or the end wall could be nearer to the damper piston and the central portion of the piston wall could be further from the damper piston.

Damper element 280 is shown in FIGS. 3-7 as extending longitudinally between opposing ends 320 and 322 and including an end wall 324 disposed along end 322 and a housing wall 326 that is secured to end wall 324 and at least partially defines a damping chamber 328 therebetween. End wall 324 is operatively connected on or along the second end member (e.g., piston 208). As identified in FIG. 4, housing wall 326 is shown as including a side wall portion 330 extending longitudinally from along end wall 324 toward an end wall portion 332 of the housing wall. End wall portion 332 of housing wall 326 includes a passage wall 334 that at least partially defines a damper passage (not numbered) extending therethrough. End wall 324 and housing wall 326 can be operatively connected to one another in any manner suitable for forming a substantially fluid-tight seal therebetween. As one example, a threaded connection (not shown), such as may be similar to threaded connection 310, for example, could be used in conjunction with one or more sealing elements (not shown) to form a substantially fluid-tight seal. As another example, a flowed-material joint 336 could be used.

As discussed above, damper elements 278 and 280 are operatively interengaged with one another for telescopic extension and compression. In the exemplary arrangement shown, a portion of damper element 278 is disposed within damping chamber 328 such that side wall 294 and end wall 306 of damper element 278 extend longitudinally-outwardly of damping chamber 328 through the damper passage (not numbered) that is at least partially defined by passage wall 334 within end wall portion 332. As such, end 296 of damper element 278 is disposed outwardly of damping chamber 328 and end 298 of damper element 278 is disposed within damping chamber 328, such that piston wall 302 extends radially-outwardly toward side wall portion 330 of housing wall 326 and separates damping chamber 328 into chamber portions 328A and 328B.

In some cases, it may be desirable to permit fluid communication between chamber portions 328A and 328B, such as by including one or more friction-reducing bushings or wear bands disposed along the interface between side wall 294 and passage wall 334 of end wall portion 332 of housing wall 326 and/or along the interface between piston wall 302 and side wall portion 330 of housing wall 326. In a preferred embodiment, however, chamber portions 328A and 328B are maintained in fluidic isolation from one another, such as by including one or more sealing elements 338 (FIG. 4) operatively disposed between side wall 294 and passage wall 334 of end wall portion 332 of housing wall 326. Additionally, such a preferred arrangement can include one or more sealing elements 340 (FIG. 4) disposed between piston wall 302 and side wall portion 330 of housing wall 326 such that a substantially fluid-tight seal is formed therebetween.

As discussed above, damper elements 278 and 280 are operatively interengaged with one another for telescopic extension and compression. As such, piston wall 302 of damper element 278 moves toward and away from end wall 324 of damper element 280 during operation and use of the gas damper assembly. A bumper or other cushioning element can optionally be disposed within either or both of chamber portions 328A and/or 328B such as may be useful to prevent or at least minimize the possibility of direct physical contact between piston wall 302 of damper element 278 and end wall 324 and/or end wall portion 332 of housing wall 326. As shown in FIGS. 3-7, a bumper 342 is disposed within chamber portion 328B and is supported along and secured to end wall 324 of damper element 280. It will be appreciated, however, that any other suitable arrangement could alternately be used. For example, a bumper could additionally, or in the alternative, be secured on along piston wall 302 of damper element 278.

As discussed above, sealing elements 338 and 340 are respectively disposed between side wall 294 and passage wall 334 of end wall portion 332 of housing wall 326 and between piston wall 302 and side wall portion 330 of housing wall 326, such that a substantially fluid-tight seals are formed therebetween. As such, in some cases, it may be desirable to permit fluid transfer into, out of and/or between chamber portions 328A and 328B depending upon the desired performance characteristics of gas damper assembly 204.

For example, the arrangement shown in FIGS. 3-7 includes a substantially fluid-tight seal formed between chamber portions 328A and 328B across piston wall 302. In some cases, piston wall 302 may include a passage or port (not shown) extending through the piston wall that would permit fluid communication between chamber portions 328A and 328B through or otherwise across the piston wall. In the alternative, housing wall 326 and/or end wall 324 can include one or more passages or ports extending therethrough that will permit pressurized gas transfer into and out of chamber portion 328A and/or 328B. For example, end wall portion 332 of housing wall 326 can include one or more passage or ports 344 extending therethrough that permit pressurized gas transfer into and out of chamber portion 328A of damping chamber 328. Additionally, end wall 324 can include one or more passages or ports 346 extending therethrough that permit pressurized gas transfer into and out of chamber portion 328B of damping chamber 328. Furthermore, one or more of the passages or ports provided on or along the walls or wall portions (e.g., end wall 324, and portions 330 and/or 332 of housing wall 326) of damper element 280 can optionally include a flow control valve that restricts pressurized gas flow through the corresponding passage or port to flow in a single direction. For example, end wall portion 332 includes a passage or port 344A that extends therethrough. A unidirectional or single direction flow control valve of a suitable type, kind and/or construction can be disposed on or along the end wall portion and can restrict pressurized gas flow to a single direction. In the exemplary arrangement shown in FIGS. 3-7, a one-way valve 348 is fluidically associated with passage 344A and permits pressurized gas transfer into chamber portion 328A through passage 344A while substantially inhibiting pressurized gas transfer out of chamber portion 328A through passage 344A. As such, in the exemplary arrangement shown, pressurized gas transfer out of chamber portion 328A occurs only through the remaining one or more of passages 344.

Gas spring and gas damper assembly 200 is shown in FIG. 3 supported between upper and lower structural components USC and LSC and having an assembly height, which is represented in FIG. 3 by reference dimension AH1, that corresponds to an initial height condition of the gas spring and gas damper assembly. In some cases, such an initial height condition may be referred to as a design height. At such a design height, rolling lobe 262 is disposed approximately at a design position along side wall portion 240 of piston 208. Additionally, at such a design height, damper piston 288 is disposed at a design position along side wall 294 within damping chamber 300, which, in turn, acts to position piston wall 302 of damper piston 304 at a design position along side wall portion 330 within damping chamber 328.

Figure 5:
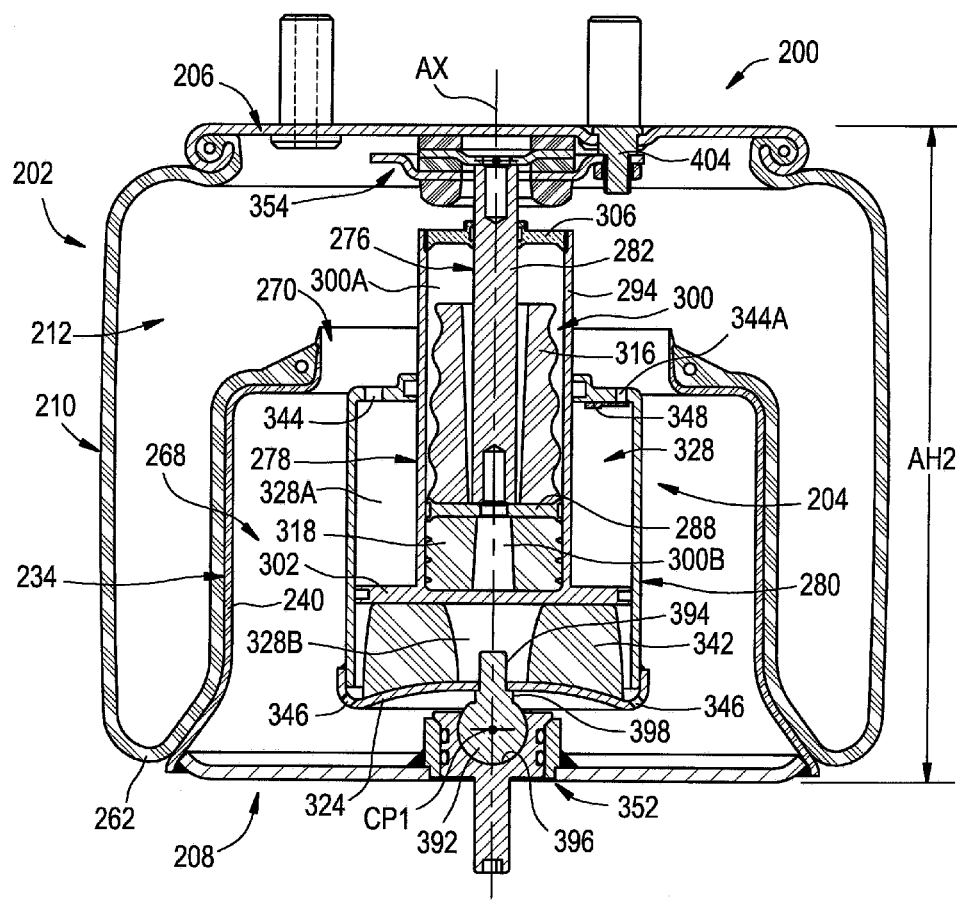
FIG. 5 is a cross-sectional side view of the gas spring and gas damper assembly in FIGS. 2-4 shown in a compressed condition.

As gas spring and gas damper assembly 200 is displaced into a compressed condition, which may be referred to in the art as a jounce condition, bead plate 206 and piston 208 are moved toward one another and may reach a compressed height, which is represented in FIG. 5 by reference dimension AH2, that is less than design height AH1. As bead plate 206 and piston 208 are displaced toward one another, damper rod 282 and damper piston 288 of damper element 276 are also displaced toward piston 208. Initially, the longitudinal forces acting on damper element 276 may be insufficient to further compress biasing element 318, which, due to the direction of displacement, could be compressively loaded during such displacement. As such, biasing element 318 may remain in approximately the same compressive condition and thereby transfer the longitudinal forces acting on damper element 276 into damper element 278. In which case, damper element 278 would compress the pressurized gas contained within chamber portion 328B and urge a portion of the pressurized gas to flow out of the chamber portion through passages 346 in end wall 324 and into piston chamber 268. It will be recognized that upon sizing and configuring passages 346 such that an appropriate total orifice area (e.g., total cross-sectional area for the active passages) for a given application is provided, such a flow of pressurized gas through passages 346 can operate to dissipate a portion of the energy acting on assembly 200 and thereby provide a damping action thereto.

As damper element 278 is displaced toward end wall 324, damper piston 304 will contact bumper 342. As discuss above, bumper 342 may also operate as a biasing element that includes a spring rate and that will deflect upon the application of a sufficiently-high longitudinal force thereto. Upon contacting bumper 342 with such a sufficiently-high force, damper piston 304 of damper element 278 will continue to urge pressurized gas through passages 346 and will also compress bumper 342, such as is shown in FIG. 5, for example. In some cases, bumper 342 may be compressed or otherwise deformed by an amount sufficient to fluidically isolate passages 346 from chamber portion 328B and thereby prevent further flow of pressurized gas through passages 346. In other cases, however, bumper 342 may be configured such that passages 346 remain in fluid communication with chamber portion 328B even at the maximum deformation of bumper 342.

Additionally, upon contacting bumper 342 or at some point earlier thereto or occurring thereafter, the longitudinal force acting on damper element 276 may result in biasing element 318 being compressed or otherwise deflected, such as is shown in FIG. 5, for example, thereby permitting damper piston 288 to translate along side wall 294 in a direction toward piston wall 302. During assembly of damper element 278, it may be desirable to preload biasing elements 316 and 318. As such, biasing element 316 may expand slightly upon translation of damper piston 288 toward piston wall 302. Depending upon the magnitude of the translation of damper piston 288 toward piston wall 302, biasing element 316 may separate from end wall 306. While it will be appreciated that the preload level of biasing elements 316 and 318 may vary from application to application, one exemplary range for the preload level can be from approximately 2% to approximately 15% of the design load of the gas spring assembly.

Furthermore, it will be recognized that as assembly 200 is compressed, the gas pressure within spring chamber 212 and piston chamber 268 increases, at least temporarily. It has been recognized that gas damping has a relationship to the magnitude of the difference between the pressure of the gas within the damping chamber (e.g., chamber portion 328B) and the pressure of the gas into which the gas from the damping chamber flows (e.g., piston chamber 268). Thus, increasing the pressure within the damping chamber (e.g., chamber portion 328B) and/or decreasing the pressure of the surrounding gas into which the gas from the damping chamber flows (e.g., piston chamber 268) can result in improved damping performance.

In addition to acting as a biasing element and preventing direct contact between piston wall 302 and end wall 324, bumper 342 may also improve the damping performance of damper 204 during compression by taking up volume within chamber portion 328B and thereby causing the gas pressure within the chamber portion to increase at a faster rate. In a preferred arrangement, gas damper assembly 206 will operate to build gas pressure within chamber portion 328B at the same or a faster rate than the rate at which the pressure is increasing within the spring and piston chambers due to compression of assembly 200. In such case, the same or a greater differential pressure can be achieved, which is expected to result in improved gas damping performance.

As described above, end wall portion 332 of housing wall 326 includes one or more passages 344 extending therethrough in fluid communication with chamber portion 328A of damping chamber 328. As damper piston 304 of damper element 278 is displaced toward end wall 324 of damper element 280, the volume of chamber portion 328A increases, which may initially result in a reduced pressure level within the chamber portion. As discussed above, however, the pressure level within spring chamber 212 and piston chamber 268 is increasing at this same time. As such, a portion of the pressurized gas within the spring and piston chambers will flow through passages 344 and into chamber portion 328A, upon sizing and configuring passages 344 such that an appropriate total orifice area (e.g., total cross-sectional area for the active passages) for a given application is used. Additionally, one or more of passages 344, such as passage 344A, for example, can be operatively associated with a one-way flow control device, such as valve 348, for example, that will permit additional pressurized gas transfer into chamber portion 328A while permitting an appropriate total orifice area to be used for damping purposed during displacement of the assembly in the opposing direction (i.e., during extension).

One benefit of permitting pressurized gas from the spring and piston chambers to flow into chamber portion 328A is that an overall reduction in the pressure within spring chamber 212 and piston chamber 268 can be achieved. And, as discussed above, improved damping performance can result from increasing the differential pressure between the gas within the damping chamber (e.g., chamber portion 328B) and the pressure of the gas into which the gas from the damping chamber flows (e.g., piston chamber 268). Another benefit of permitting pressurized gas from the spring and piston chambers to flow into chamber portion 328A is that the gas pressure within chamber portion 328A is at least temporarily increased. As will be discussed in greater detail hereinafter, such an increased pressure level can provide a further increased pressure differential between the gas within chamber portion 328A and the gas into which the gas from chamber portion 328A will flow during extension.

Figure 6:
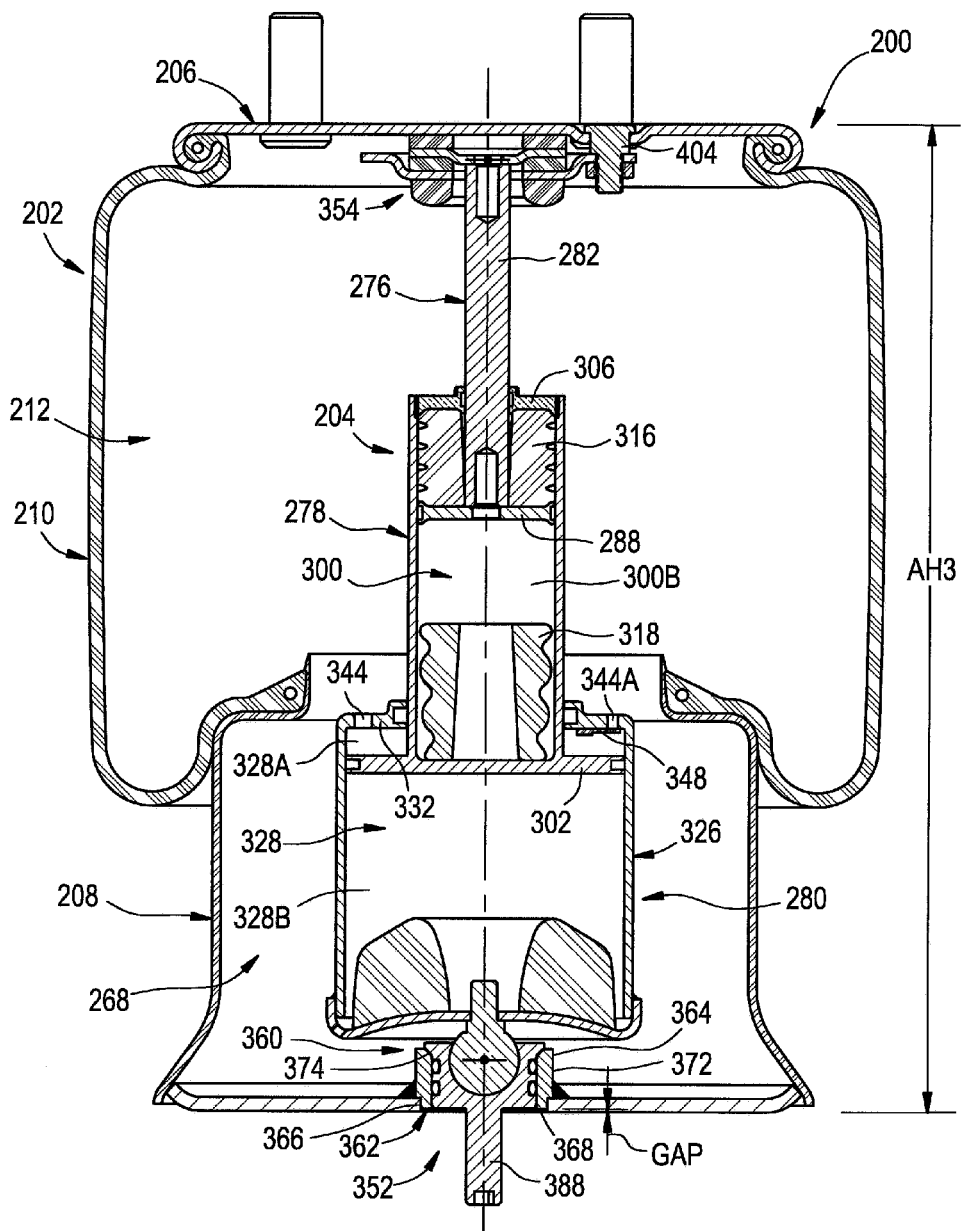
FIG. 6 is a cross-sectional side view of the gas spring and gas damper assembly in FIGS. 2-5 shown in an extended condition.

As gas spring and gas damper assembly 200 is displaced into an extended condition, which may be referred to in the art as a rebound condition, bead plate 206 and piston 208 are moved away one another and may reach an extended height, which is represented in FIG. 6 by reference dimension AH3, that is greater than design height AH1. As bead plate 206 and piston 208 are displaced away from one another, damper rod 282 and damper piston 288 of damper element 276 are also displaced away from piston 208. Initially, the longitudinal forces acting on damper element 276 may be insufficient to further compress biasing element 316, which, due to the direction of displacement, could be compressively loaded during such displacement. As such, biasing element 316 may remain in approximately the same compressive condition and thereby transfer the longitudinal forces acting on damper element 276 into damper element 278. In which case, damper element 278 would compress the pressurized gas contained within chamber portion 328A and urge a portion of the pressurized gas to flow out of the chamber portion through one or more of passages 344 in end wall portion 332 of housing wall 326 and into spring chamber 212. It will be appreciated that valve 348 will cause passage 344A to remain fluidically isolated from chamber portion 328A, under such conditions, such that pressurized gas does not flow out of the chamber portion through passage 344A.

It will be appreciated that pressurized gas within chamber portion 328A is capable of flowing through passages at a given rate depending upon various factors, such as the total orifice area of passages 344, for example. As such, continued extension of assembly 200 can compress the gas within chamber portion 328A and thereby increase the pressure level thereof. This increased pressure level may, at some point, generate a sufficiently-high longitudinal force acting on damper element 276 that results in biasing element 316 being compressed or otherwise deflected, such as is shown in FIG. 6, for example, thereby permitting damper piston 288 to translate along side wall 294 in a direction toward end wall 306.

Additionally, it will be recognized that as assembly 200 is extended, the gas pressure within spring chamber 212 and piston chamber 268 decreases, at least temporarily. At that same time, the gas pressure within chamber portion 328A is increasing, such as has been described above, for example. As a result, an increased differential pressure between the gas within the damping chamber (e.g., chamber portion 328A) and the pressure of the gas into which the gas from the damping chamber flows (e.g., spring chamber 212) may be achieved, which may provide increased damping performance. Additionally, as described above, valve 348 can act as a charging valve that permits an increased volume of pressurized gas to transfer into chamber portion 328A during compression, which can result in an increased overall pressure level within the chamber portion. Upon transitioning to extension, this increased overall pressure level represents the initial pressure level of the pressurized gas within chamber portion 328A as the chamber portion begins to undergo compression, as described above.

Figure 7:
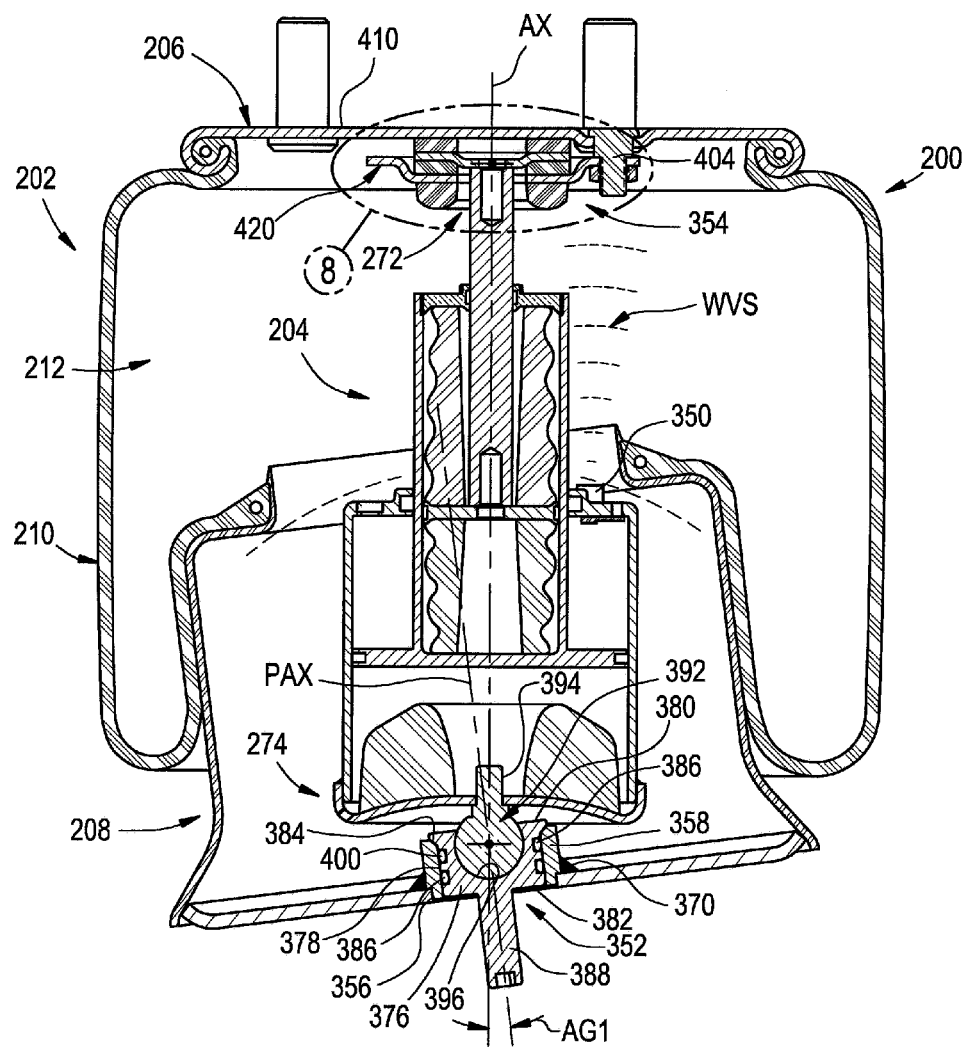
FIG. 7 is a cross-sectional side view of the gas spring and gas damper assembly in FIGS. 2-6 shown undergoing an angular deflection.

Gas spring and gas damper assembly can optionally include any number of one or more additional elements, features and/or components. For example, a distance sensing device can be operatively connected on or along one of the components of the gas spring assembly or the gas damper assembly. As shown in FIGS. 4 and 7, for example, a height sensor 350 can be operatively secured on or along end wall portion 332 of housing wall 326 and can transmit suitable electromagnetic or ultrasonic waves WVS in an approximately longitudinal direction toward bead plate 206. It will be appreciated, however, that other arrangements could alternately be used.

It will be recognized that the foregoing discussion of FIGS. 3-6 regarding the displacement of gas spring and gas damper assembly 200 from a design height to a compressed height and an extended height included movement in a substantially longitudinal direction. In many applications, such as vehicle applications, for example, conventional gas spring assemblies are often displaced such that the first or upper end member (e.g., bead plate 206) and the second or lower end member (e.g., piston 208) are disposed at an angle relative to one another. In some cases, the angle may change (e.g., increase or decrease) as the end members are displaced toward and away from one another. It will be appreciated that conventional gas spring assemblies can typically accommodate such angular misalignments. In some cases, however, the gas spring assembly will include an internally mounted device, such as a rebound limiter or a spring aid, for example, that can limit the amount of angular misalignment that can be accommodated.

As described above, gas damper assembly 204, which represents another example of an internally mounted device, extends longitudinally between an end 272 that is operatively connected to bead plate 206 and an end 274 that is operatively connected to piston 208. For the subject matter of the present disclosure to be capable of broad use in a wide variety of applications, it is desirable for gas spring assembly 202 to be capable of operation in applications and operating conditions that can result in relatively high misalignment conditions without interfering with the operation and/or seal integrity of gas damper assembly 204. As such, end 274 of gas damper assembly 204 can be operatively connected with piston 208 by way of a high-articulation misalignment mount 352 that is capable of freely compliant (e.g., non-resilient) articulation, such as is shown in FIGS. 3-7. Additionally, end 272 of gas damper assembly 204 can be operatively connected with bead plate 206 by way of a low-profile misalignment mount 354, such as is shown in FIGS. 3-7. It will be appreciated, however, that mounts 352 and 354 are optional and that either one or both of mounts 352 and 354 can, optionally, be included on or used in connection with gas spring and gas damper assembly 200.

Figure 8:
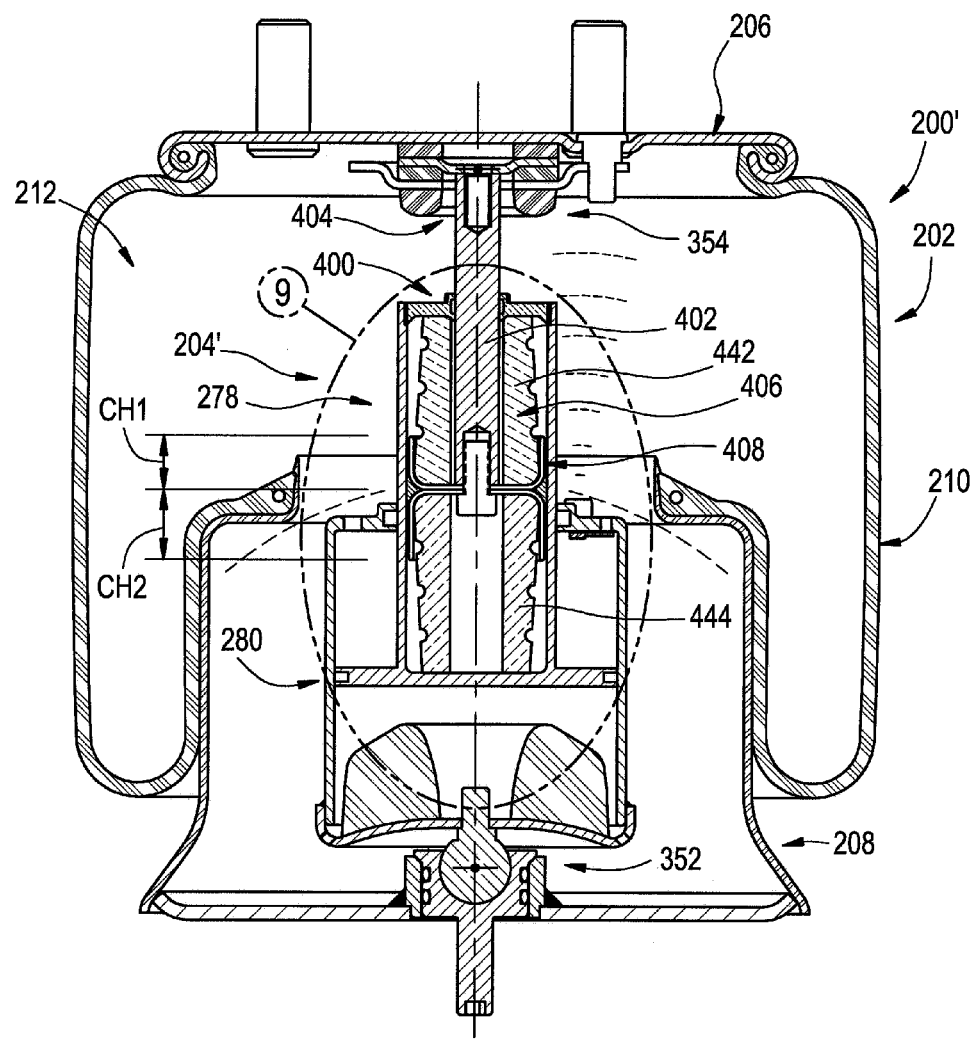
FIG. 8 is a cross-sectional side view of another example of a gas spring and gas damper assembly in accordance with the subject matter of the present disclosure.
Figure 9:
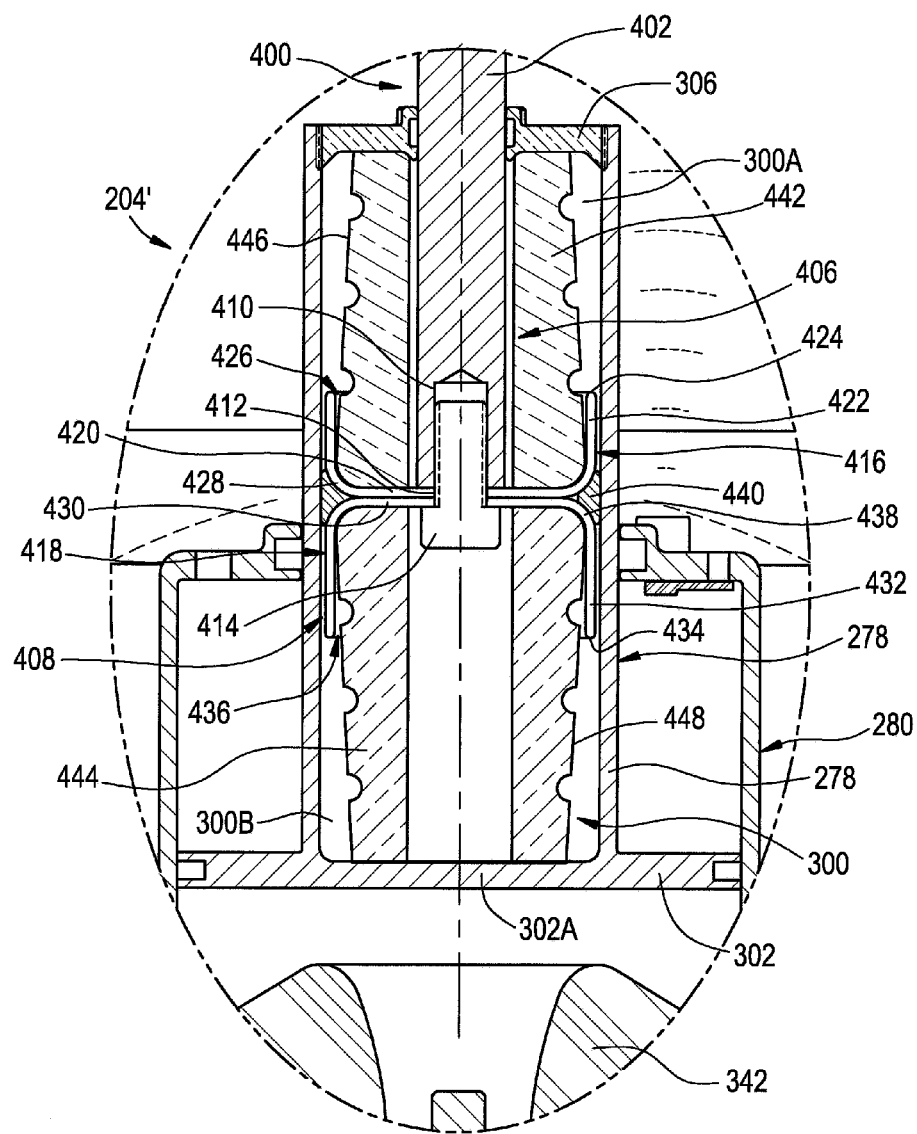
FIG. 9 is an enlarged, cross-sectional view of the portion of the gas spring and gas damper assembly identified as Detail 9 in FIG. 8.

An alternate construction of a gas spring and gas damper assembly in accordance with the subject matter of the present disclosure is shown in FIGS. 8 and 9, and is identified therein as gas spring and gas damper assembly 200'. It will be appreciated that gas spring and gas damper assembly 200' is substantially similar to gas spring and gas damper assembly 200, which has been described above in detail in connection with FIGS. 2-7, and includes gas spring assembly 202 and a gas damper assembly 204'. It is to be recognized and understood that construction, operation and interconnection of components of gas spring and gas damper assembly 200' can be substantially identical to the function, operation and interconnection of components in gas spring and gas damper assembly 200. As such, full detailed descriptions of the components and assemblies are not repeated here for purposes of brevity. However, it is to be distinctly understood that the foregoing descriptions of gas spring and gas damper assembly 200, as well as the components, features, operations and interconnections thereof, are equally applicable to gas spring and gas damper assembly 200', except where pointed out and discussed to the contrary.

As discussed above in detail in connection with FIGS. 2-7, gas spring assembly 202 has a longitudinally-extending axis AX and includes a first or upper end member, such as a bead plate 206, for example, and an opposing second or lower end member, such as a piston 208, for example, that is spaced longitudinally from the first end member. A flexible wall, such as a flexible sleeve 210, for example, can be secured between the first end member (e.g., bead plate 206) and the second end member (e.g., piston 208) in a suitable manner such that a spring chamber 212 is at least partially formed therebetween.

Gas damper assembly 204' is shown in FIGS. 8 and 9 as being substantially entirely contained within gas spring assembly 202 and extending longitudinally between an end 272 that is operatively connected to bead plate 206 and an end 274 that is operatively connected to piston 208. Gas damper assembly 204' includes a plurality of damper elements that are operatively interconnected with one another for telescopic extension and compression in relation to corresponding extension and compression of gas spring assembly 202.

As discussed above in connection with FIGS. 2-7, it will be appreciated that it is generally desirable for gas spring assembly 202 to be capable of operation in applications and operating conditions that can result in relatively high misalignment conditions without interfering with the operation and/or seal integrity of gas damper assembly 204'. As such, end 274 of gas damper assembly 204' can be operatively connected with piston 208 by way of a high-articulation misalignment mount 352 that is capable of freely compliant (e.g., non-resilient) articulation, such as is shown in FIGS. 3-7. Additionally, end 272 of gas damper assembly 204' can be operatively connected with bead plate 206 by way of a low-profile misalignment mount 354, such as is shown in FIGS. 3-7. It will be appreciated, however, that mounts 352 and 354 are optional and that either one or both of mounts 352 and 354 can, optionally, be included on or used in connection with gas spring and gas damper assembly 200'.

In the exemplary arrangement in FIGS. 8 and 9, gas damper assembly 204' is shown as including damper elements 400, 278 and 280 that are operatively interconnected with one another for telescopic extension and compression, as has been discussed above in detail. Generally, it will be recognized and appreciated that gas damper assembly 204' differs from gas damper assembly 204 in that damper element 400 has a different construction and may provide alternate features in comparison with damper element 276, which has been described above in detail.

Damper element 400 is operatively connected to the first end member (e.g., bead plate 206) and extends from the first end member toward the second end member (e.g., piston 208). Damper element 280 is operatively connected to the second end member (e.g. piston 208) and extends from the second end member toward the first end member (e.g., bead plate 206). Damper element 278 is disposed longitudinally between damper elements 400 and 280, and is operatively interconnected therewith such that damper elements 400 and 278 can move relative to one another and such that damper element 278 and 280 can move relative to one another.

As shown in FIGS. 8 and 9, damper element 400 includes a damper rod 402 that extends longitudinally from an end 404 to an end 406. A damper piston assembly 408 is disposed along end 406 of damper rod 402 and can be attached or otherwise connected thereto in any suitable manner. As one example, the damper piston could be integrally formed with the damper rod. As another example, end 406 of damper rod 402 could include a securement feature, such as a threaded passage 410 (FIG. 9), for example. As identified in FIG. 9, damper piston assembly 408 could include a hole or opening 412 extending therethrough such that a securement device, such as a threaded fastener 414, for example, could be used to secure damper piston assembly 408 along end 406 of damper rod 402.

Damper piston assembly 408 can include one or more piston elements as well as one or more wall-engaging elements. In the arrangement shown in FIGS. 8 and 9, for example, damper piston assembly 408 includes a piston cup 416 that is secured along end 406 of damper rod 402. Damper piston assembly 408 also includes a piston cup 418 that is secured along end 406 of damper rod 402 in abutting engagement with piston cup 416. It will be appreciated that either or both of piston cups 416 and 418 can be used.

Piston cup 416 is shown as including an end wall 420 and an outer peripheral side wall 422 that extends from along end wall 420 toward a distal edge 424. End wall 420 and outer peripheral side wall 422 at least partially define a cavity 426 within piston cup 416. In some cases, a curved wall portion 428 can extend or otherwise transition between end wall 420 and outer peripheral side wall 422. Similarly, piston cup 418 is shown as including an end wall 430 and an outer peripheral side wall 432 that extends from along end wall 430 toward a distal edge 434. End wall 430 and outer peripheral side wall 432 at least partially define a cavity 436 within piston cup 418. In some cases, a curved wall portion 438 can extend or otherwise transition between end wall 430 and outer peripheral side wall 432. In the arrangement shown in FIGS. 8 and 9, end walls 420 and 430 are disposed in abutting engagement with one another such that openings 412 can be formed therethrough, such as to receive threaded fastener 414, for example. As such, cavities 426 and 436 have open ends (not numbered) that face away from one another with end 406 of damper rod 402 received within cavity 426 and abuttingly engaging end wall 420.

Additionally, it will be appreciated that, in some cases, the piston cups can be substantially identical to one another. In other cases, however, the piston cups can have one or more dimensions that differ from one another. For example, piston cups 416 and 418 are shown as having substantially identical cross-sectional diameter dimensions. However, piston cup 416 is shown as having a dimension CH1 (FIG. 8) extending from end wall 420 to distal edge 424 and piston cup 418 is shown as having a dimension CH2 (FIG. 8) extending from end wall 430 to distal edge 434 with dimension CH2 being greater than dimension CH1. It will be appreciated, however, that other configurations and/or constructions could alternately be used.

As discussed above, damper element 278 defines damping chamber 300 and damper piston assembly 408 together with a portion of damper rod 402 are disposed within damping chamber 300 such that the damping chamber is separated into chamber portions 300A and 300B. In some cases, it may be desirable to maintain chamber portions 300A and 300B in fluidic isolation from one another, such as by including one or more sealing elements (not shown) operatively disposed between damper piston assembly 408 and side wall 294 of damper element 278. Additionally, or in the alternative, a friction-reducing bushing or wear band 440 can, optionally, be disposed between damper piston assembly 408 and side wall 294 of damper element 278. It will be appreciated that such a friction-reducing bushing or wear band can be of any suitable size, shape, configuration and/or construction, and can be formed from any suitable material or combination of materials. As one example, wear band 440 is shown as having a somewhat triangular cross-sectional shape and being positioned within a gap or space (not identified) formed between side wall 294 and curved wall portions 428 and 428 of the damper piston assembly.

Gas damper assembly 204' also includes biasing elements 442 and 444, which are respectively disposed within chamber portions 300A and 300B of damper element 278. It is to be recognized and understood that construction, operation and interconnection of components of biasing elements 442 and 444 can be substantially identical to the function, operation and construction of biasing elements 316 and 318, which have been discussed above in detail. As such, full detailed descriptions of the function, operation and construction of biasing elements is not repeated here, for purposes of brevity. However, it is to be distinctly understood that the foregoing descriptions of biasing elements 316 and 318 is equally applicable to biasing elements 442 and 444, except where pointed out and discussed to the contrary.

In general, biasing elements 442 and 444 can include a base or mounting end (not numbered) having a base or mounting end surface (not numbered), and a distal end (not numbered) having a distal end surface (not numbered). Additionally, biasing elements 442 and 444 can have an outer surface (not numbered) extending lengthwise between the mounting and distal ends. Furthermore, biasing elements 442 and/or 444 can, optionally, include an inner surface (not numbered), such as may define an inner passage (not numbered) dimensioned to receive at least a portion of an associated damping rod (e.g., damping rod 402).

It will be recognized from FIGS. 8 and 9 that biasing elements 442 and 444 operatively engage damper piston assembly 408 in a manner that differs from the operative engagement of biasing elements 316 and 318 with damper piston 288. In particular, biasing elements 442 and 444 are, respectively, at least partially received within cavities 426 and 436 of piston cups 416 and 418. As such, outer peripheral side walls 422 and 432 extend, respectively, along outer side surfaces 446 and 448 of biasing elements 442 and 444. In this manner, outer peripheral side walls 422 and 432 are disposed between the biasing elements and side wall 294 of damper element 278.

One benefit of such a configuration is that in some conditions of use the outer peripheral side walls of the piston cups can restrain expansion of at least a portion of the biasing elements, such as in an area adjacent the damper piston assembly. In some conditions of use, such as conditions of use shown in FIGS. 5 and 6, at least one of the biasing elements can be axially compressed which results in a corresponding amount of radially-outward expansion. Generally, such radially-outward expansion can apply pressure on or along side wall 294 of damper element 278, which can inhibit movement of the damper and/or reduce the overall performance of the gas damper assembly. The use of a construction such as that of damper piston assembly 408 can restrain expansion of the biasing elements, which can result in an improved performance of the gas damper assembly and/or may also result in reduced-weight constructions and/or reduced cost of manufacture.

Figure 10:
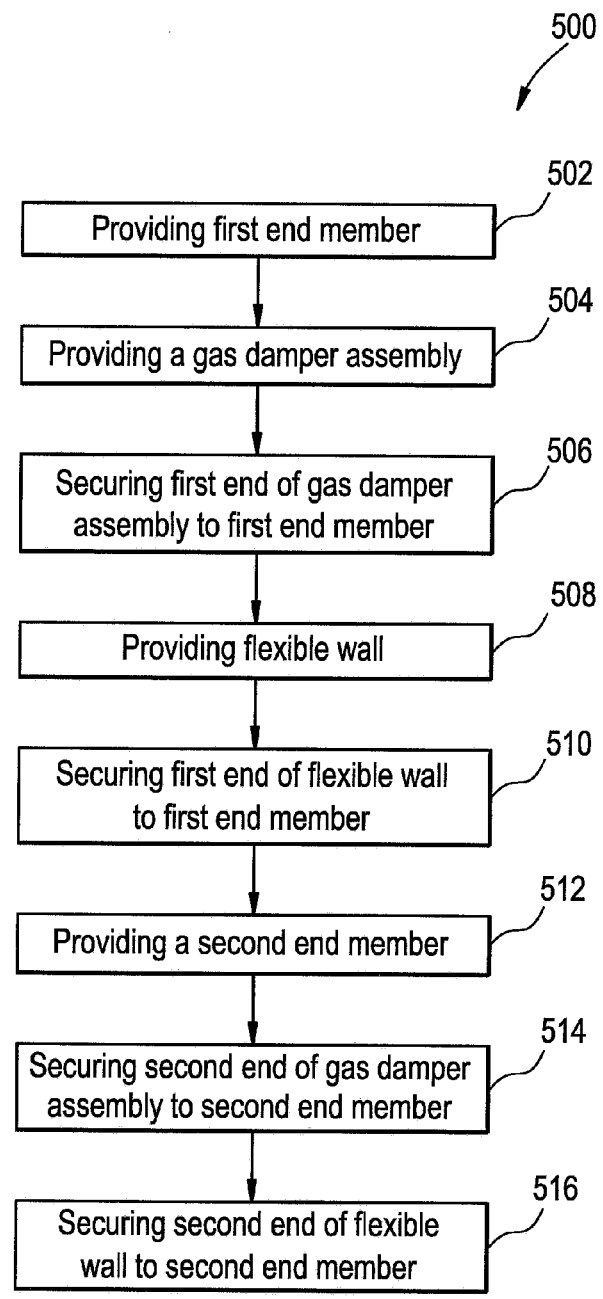
FIG. 10 is a graphical representation of one example of a method of assembling a gas spring and gas damper assembly in accordance with the subject matter of the present disclosure.

One example of a method of assembling a gas spring and gas damper assembly in accordance with the subject matter of the present disclosure, such as gas spring and gas damper assemblies 200 and/or 200', for example, is illustrated in FIG. 10 as method 500. The method can include providing a first end member of the gas spring assembly (e.g., bead plate 206 of gas spring assembly 202, as is represented in FIG. 10 by item number 502. Method 500 can also include providing a gas damper assembly (e.g., gas damper assembly 204 and/or 204'), as is represented in FIG. 10 by item number 504. The method can further include securing a first end (e.g., end 272) of the gas damper assembly on or along the first end member, as is represented by item number 506. Method 500 can further include providing a flexible wall (e.g., flexible wall 210), as is represented by item number 508, and securing a first end (e.g., end 214) of the flexible wall on or along the first end member, as is represented in FIG. 10 by item 510. Method 500 can also include providing a second end member (e.g., piston 208), as is represented by item number 512, and securing a second end (e.g., end 274) of the gas damper assembly on or along the second end member, as is represented in FIG. 10 by item number 514. Method 500 can further include securing a second end (e.g., end 216) of the flexible wall on or along the second end member, as is represented in FIG. 10 by item number 516.

One example of a method of assembling a gas damper assembly in accordance with the subject matter of the present disclosure, such as gas damper assembly 204 and/or 204', for example, is illustrated in FIG. 11 as method 600. The method can include providing a first damper component including a housing wall (e.g., housing wall 326) having opposing open ends (e.g., the damper passage at least partially defined by passage wall 334 and the open end formed by side wall portion 330 along end 322), as is represented in FIG. 11 by item number 602. Method 600 also includes providing a second damper component including a housing wall (e.g., side wall 294) having an open end (e.g., the open end formed by side wall 294 along end 296) and a piston wall (e.g., piston wall 302), as is represented by item number 604. Method 600 can further include positioning the piston wall within the housing wall (e.g., housing wall 326) of the first damper component with the housing wall (e.g., side wall 294) of the second damper component extending through an open end (e.g., the damper passage at least partially defined by passage wall 334) of the first damper component, as is represented in FIG. 11 by item number 606. Method 600 can also include securing an end wall (e.g., end wall 324) across the remaining open end (e.g., the open end formed by side wall portion 330 along end 322) to form a damping chamber (e.g., damping chamber 328), as is represented by item number 608.

Method 600 can also include providing a third damper component including a damper rod (e.g., damper rod 282 or 402) and a damper piston (e.g., damper piston 288 or 408), as is represented in FIG. 11 by item number 610. Method 600 can further include providing a first biasing element (e.g., biasing element 318 or 444) and inserting the first biasing element into a damping chamber (e.g., damping chamber 300) of the second damper component, as is represented by item number 612. Method 600 can also include positioning the damper piston (e.g., damper piston 288 or 408) within the damping chamber (e.g., damping chamber 300) defined by the housing wall (e.g., side wall 294) with the damping rod (e.g., damping rod 282 or 402) projecting outwardly from the open end (e.g., the open end formed by side wall 294 along end 296) of the housing wall, as is represented by item number 614. Method 600 can further include providing a second biasing element (e.g., biasing element 316 or 442) and inserting the second biasing element into the damping chamber of the second damper component, as is represented in FIG. 11 by item number 616. Method 600 can also include applying a preload to the first and/or second biasing elements (e.g., biasing elements 318 and 316, and/or 444 and 442) and securing an end wall (e.g., end wall 306) across the open end of the housing wall of the second damper component, as is represented in FIG. 11 by item number 618.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse,"

and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, terms such as "gas," "pneumatic" and "fluid" as well as variants thereof, are used herein to broadly refer to and include any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein and whether or not initially presented in herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. A damper element assembly dimensioned for use in an associated gas spring and gas damper assembly, said damper piston assembly comprising:

a damper rod having a longitudinal axis and extending longitudinally between opposing first and second ends;

a first outer side wall portion disposed along said second end of said damper rod, said first outer side wall portion extending peripherally about said longitudinal axis and extending in a generally longitudinally direction, said first outer side wall portion disposed in radially-outward spaced relation to said damper rod and including an inner surface and an outer surface, said inner surface at least partially defining a first cavity having a first open end;

a first biasing element including a base end, a distal end and an outer surface with at least a portion of said base end of said first biasing element disposed within said first cavity and at least a portion of said outer surface disposed adjacent said inner surface of said first outer side wall portion such that under load conditions in which said first biasing element is axially compressed said first outer side wall portion restrains radially-outward expansion of said first biasing element; and, a second outer side wall portion disposed along said second end of said damper rod in axially-spaced relation to said first outer side wall portion, said second outer side wall portion extending peripherally about said longitudinal axis and extending in a generally longitudinally direction, said second outer side wall portion disposed in radially-outward spaced relation to said damper rod and including an inner surface and an outer surface with said inner surface at least partially defining a second cavity having a second open end facing axially-opposite said first open end.

2. A damper element assembly according to claim 1 further comprising a first end wall portion disposed transverse to said longitudinal axis and operatively connected with said first outer side wall portion.

3. A damper element assembly according to claim 2, wherein said first end wall portion and said first side wall portion at least partially define a first piston element having a U-shaped cross-sectional configuration.

4. A damper element assembly according to claim 1 further comprising a second end wall portion disposed transverse to said longitudinal axis and operatively connected with said second outer side wall portion.

5. A damper element assembly according to claim 4, wherein said second end wall portion and said second side wall portion at least partially defining a second piston element having a U-shaped cross-sectional configuration.

6. A damper element assembly according to claim 1 further comprising a second biasing element including a base end, a distal end and an outer surface with at least a portion of said base end of said second biasing element disposed within said second cavity and at least a portion of said outer surface disposed adjacent said inner surface of said second outer side wall portion such that under load conditions in which said second biasing element is axially compressed said second outer side wall portion restrain radially-outward expansion of said second biasing element.

7. A damper element assembly according to claim 1, wherein said first outer side wall portion extends to a first distal edge and has a first wall portion length, and said second outer side wall portion extends to a second distal edge disposed opposite said first distal edge and has a second wall portion length that is different than said first wall portion length.

8. A damper element assembly dimensioned for use in an associated gas spring and gas damper assembly, said damper piston assembly comprising:

a damper rod having a longitudinal axis and extending longitudinally between opposing first and second ends;

a first outer side wall portion disposed along said second end of said damper rod, said first outer side wall portion extending peripherally about said longitudinal axis and extending in a generally longitudinally direction, said first outer side wall portion disposed in radially-outward spaced relation to said damper rod and including an inner surface and an outer surface, said inner surface at least partially defining a first cavity having a first open end;

a first biasing element including a base end, a distal end and an outer surface with at least a portion of said base end of said first biasing element disposed within said first cavity and at least a portion of said outer surface disposed adjacent said inner surface of said first outer side wall portion such that under load conditions in which said first biasing element is axially compressed said first outer side wall portion restrains radially-outward expansion of said first biasing element; and, a wall-engaging element disposed adjacent said first outer wall portion, said wall-engaging element having an outer surface extending radially outward beyond said outer surface of said first outer wall portion and operative to provide a friction-reduced surface for contacting an associated damper wall.

9. A damper element assembly according to claim 8 further comprising:

a second outer side wall portion disposed along said second end of said damper rod in axially-spaced relation to said first outer side wall portion, said second outer side wall portion extending peripherally about said longitudinal axis and extending in a generally longitudinally direction, said second outer side wall portion disposed in radially-outward spaced relation to said damper rod and including an inner surface and an outer surface with said inner surface at least partially defining a second cavity having a second open end facing axially-opposite said first open end; and, a second biasing element including a base end, a distal end and an outer surface with at least a portion of said base end of said second biasing element disposed within said second cavity and at least a portion of said outer surface disposed adjacent said inner surface of said second outer side wall portion such that under load conditions in which said second biasing element is axially compressed said second outer side wall portion restrain radially-outward expansion of said second biasing element.

10. A gas spring and gas damper assembly comprising:

a gas spring assembly having a longitudinal axis and including:
  a first end member;
  a second end member spaced longitudinally from said first end member; and,
  a flexible wall extending circumferentially about said longitudinal axis and being operatively connected between said first and second end members such that a spring chamber is at least partially defined therebetween; and, a gas damper assembly at least partially disposed within said spring chamber and operatively connected between said first and second end members, said gas damper assembly including:
  a first damper element operatively connected to said first end member and including a first side wall and a first end wall that at least partially define a first damping chamber;

a second damper element extending longitudinally between a first end and a second end opposite said first end, said second damper element including a second end wall and a second side wall at least partially defining a second damping chamber, said second end wall disposed transverse to said second side wall and at least partially forming a second element piston, said second damper element being oriented such that said second element piston and at least a portion of said second side wall are disposed within said first damping chamber, said second damper element being slidably supported within said first damping chamber such that said second end wall is displaceable relative to said first side wall of said first damper element; and, a damper element assembly including:
  a damper rod having a longitudinal axis and extending longitudinally between opposing first and second ends;
  a first outer side wall portion disposed along said second end of said damper rod, said first outer side wall portion extending peripherally about said longitudinal axis and extending in a generally longitudinally direction, said first outer side wall portion disposed in radially-outward spaced relation to said damper rod and including an inner surface and an outer surface, said inner surface at least partially defining a first cavity having a first open end; and,
  a first biasing element including a base end, a distal end and an outer surface with at least a portion of said base end of said first biasing element disposed within said first cavity and at least a portion of said outer surface disposed adjacent said inner surface of said first outer side wall portion such that under load conditions in which said first biasing element is axially compressed said first outer side wall portion restrains radially-outward expansion of said first biasing element;
  said damper element assembly disposed within said spring chamber and operatively connected to said second end member such that at least said first outer side wall portion is disposed within said second damping chamber.

11. A suspension system comprising:
at least one gas spring and gas damper assembly according to claim 10; and,
a pressurized gas system operative to selectively transfer pressurized gas into and out of said at least one gas spring and gas damper assembly.

12. A method of assembling a gas spring and gas damper assembly, said method comprising:
providing a first damper element including a first end wall and a first side wall at least partially defining a first damping chamber;
providing a second damper element extending longitudinally between a first end and a second end opposite said first end, said second damper element including a second end wall and a second side wall at least partially defining a second damping chamber, said second end wall disposed transverse to said second side wall and at least partially forming a second element piston;
positioning said second element piston and at least a portion of said second side wall within said first damping chamber such that said second damper element is slidably supported within said first damping chamber and said second element piston is displaceable relative to said first side wall of said first damper element;

providing a damper element assembly including:
- a damper rod having a longitudinal axis and extending longitudinally between opposing first and second ends;
- a first outer side wall portion disposed along said second end of said damper rod, said first outer side wall portion extending peripherally about said longitudinal axis and extending in a generally longitudinally direction, said first outer side wall portion disposed in radially-outward spaced relation to said damper rod and including an inner surface and an outer surface, said inner surface at least partially defining a first cavity having a first open end; and,
- a first biasing element including a base end, a distal end and an outer surface with at least a portion of said base end of said first biasing element disposed within said first cavity and at least a portion of said outer surface disposed adjacent said inner surface of said first outer side wall portion such that under load conditions in which said first biasing element is axially compressed said first outer side wall portion restrains radially-outward expansion of said first biasing element; and, orienting said damper element assembly such that said first outer side wall portion and at least a portion of said damper rod are disposed within said second damping chamber.

13. A gas spring and gas damper assembly according to claim 10 further comprising a first end wall portion disposed transverse to said longitudinal axis and operatively connected with said first outer side wall portion.

14. A gas spring and gas damper assembly according to claim 13, wherein said first end wall portion and said first side wall portion at least partially define a first piston element having a U-shaped cross-sectional configuration.

15. A gas spring and gas damper assembly according to claim 10 further comprising a second outer side wall portion disposed along said second end of said damper rod in axially-spaced relation to said first outer side wall portion, said second outer side wall portion extending peripherally about said longitudinal axis and extending in a generally longitudinally direction, said second outer side wall portion disposed in radially-outward spaced relation to said damper rod and including an inner surface and an outer surface with said inner surface at least partially defining a second cavity having a second open end facing axially-opposite said first open end.

16. A gas spring and gas damper assembly according to claim 15 further comprising a second end wall portion disposed transverse to said longitudinal axis and operatively connected with said second outer side wall portion, said second end wall portion and said second side wall portion at least partially defining a second piston element having a U-shaped cross-sectional configuration.

17. A gas spring and gas damper assembly according to claim 15 further comprising a second biasing element including a base end, a distal end and an outer surface with at least a portion of said base end of said second biasing element disposed within said second cavity and at least a portion of said outer surface disposed adjacent said inner surface of said second outer side wall portion such that under load conditions in which said second biasing element is axially compressed said second outer side wall portion restrains radially-outward expansion of said second biasing element.

18. A gas spring and gas damper assembly according to claim 15, wherein said first outer side wall portion extends to a first distal edge and has a first wall portion length, and said second outer side wall portion extends to a second distal edge disposed opposite said first distal edge and has a second wall portion length that is different than said first wall portion length.

19. A gas spring and gas damper assembly according to claim 10 further comprising a wall-engaging element disposed adjacent said first outer wall portion, said wall-engaging element having an outer surface extending radially outward beyond said outer surface of said first outer wall portion and operative to provide a friction-reduced surface for contacting an associated damper wall.

20. A method according to claim 12 further comprising:
providing a first end member, a second end member and a flexible wall;
securing said first damper element on said first end member and securing said damper element assembly on said second end member; and,
securing said flexible wall between said first and second end members such that a spring chamber is at least partially formed by said flexible wall between said first and second end member with said spring chamber containing at least said first damper element, said second damper element and said damper element assembly.

* * * * *